(12) United States Patent
Adjaoute

(10) Patent No.: US 11,062,317 B2
(45) Date of Patent: Jul. 13, 2021

(54) DATA BREACH DETECTION

(71) Applicant: Brighterion, Inc., Purchase, NY (US)

(72) Inventor: Akli Adjaoute, Mill Valley, CA (US)

(73) Assignee: Brighterion, Inc., Purchase, NY (US)

( * ) Notice: Subject to any disclaimer, the term of this patent is extended or adjusted under 35 U.S.C. 154(b) by 0 days.

(21) Appl. No.: 16/369,626

(22) Filed: Mar. 29, 2019

(65) Prior Publication Data

US 2019/0228415 A1    Jul. 25, 2019

Related U.S. Application Data

(63) Continuation of application No. 14/525,273, filed on Oct. 28, 2014, now Pat. No. 10,290,001.

(51) Int. Cl.
*G06Q 20/40* (2012.01)
*G06Q 30/02* (2012.01)

(52) U.S. Cl.
CPC ..... *G06Q 20/4016* (2013.01); *G06Q 30/0225* (2013.01)

(58) Field of Classification Search
CPC .......................... G06Q 20/40; G06Q 30/0225
USPC ...................................... 705/35–45
See application file for complete search history.

(56) References Cited

U.S. PATENT DOCUMENTS

| | | |
|---|---|---|
| 5,377,354 A | 12/1994 | Scannell et al. |
| 5,692,107 A | 11/1997 | Simoudis et al. |
| 5,819,226 A | 10/1998 | Gopinathan et al. |
| 5,822,741 A | 10/1998 | Fischthal |
| 6,009,199 A | 12/1999 | Ho |
| 6,026,397 A | 2/2000 | Sheppard |
| 6,029,154 A | 2/2000 | Pettitt |
| 6,122,624 A | 9/2000 | Tetro et al. |
| 6,161,130 A | 12/2000 | Horvitz et al. |
| 6,254,000 B1 | 7/2001 | Degen et al. |
| 6,272,479 B1 | 8/2001 | Farry et al. |
| 6,330,546 B1 | 12/2001 | Gopinathan et al. |

(Continued)

FOREIGN PATENT DOCUMENTS

| | | |
|---|---|---|
| DE | 4230419 | 3/1994 |
| EP | 0647903 | 4/1995 |

(Continued)

OTHER PUBLICATIONS

Clarke et al., Dynamic Forecasting Behavior by Analysts Theory and Evidence, 2005, Journal of Financial Economics (Year:2005).

(Continued)

*Primary Examiner* — Robert R Niquette
(74) *Attorney, Agent, or Firm* — Hovey Williams LLP

(57) ABSTRACT

A merchant data breach process comprises processing daily payment transaction data with a risk and compliance platform to obtain a fraud score for each constituent transaction. Constituent transactions with high risk fraud scores are sorted into a table according to the transaction date, cardholder, and merchant. The table data is scored according to suspected card visits, highly probable visits, and all card visits. The scores are normalized according to merchant size grouping through the use of multipliers. The normalized scores are summed together day-by-day into a final score. A timely warning of an underlying and expanding security rupture caused by a merchant data breach is issued for damage control and law enforcement.

20 Claims, 18 Drawing Sheets

(56) References Cited

U.S. PATENT DOCUMENTS

| | | | |
|---|---|---|---|
| 6,347,374 B1 | 2/2002 | Drake et al. | |
| 6,424,997 B1 | 7/2002 | Buskirk, Jr. et al. | |
| 6,453,246 B1 | 9/2002 | Agrafiotis et al. | |
| 6,535,728 B1 | 3/2003 | Perfit et al. | |
| 6,601,048 B1 | 7/2003 | Gavan et al. | |
| 6,647,379 B2 | 11/2003 | Howard et al. | |
| 6,711,615 B2 | 3/2004 | Porras et al. | |
| 6,782,375 B2 | 8/2004 | Abdel-Moneim et al. | |
| 6,889,207 B2 | 5/2005 | Slemmer et al. | |
| 7,007,067 B1 | 2/2006 | Azvine et al. | |
| 7,036,146 B1 | 4/2006 | Goldsmith | |
| 7,089,592 B2 | 8/2006 | Adjaoute | |
| 7,165,037 B2 | 1/2007 | Lazarus et al. | |
| 7,251,624 B1* | 7/2007 | Lee | G06Q 30/06 705/26.1 |
| 7,406,502 B1 | 7/2008 | Oliver et al. | |
| 7,433,960 B1 | 10/2008 | Dube et al. | |
| 7,457,401 B2 | 11/2008 | Lawyer et al. | |
| 7,464,264 B2 | 12/2008 | Goodman et al. | |
| 7,483,947 B2 | 1/2009 | Starbuck et al. | |
| 7,562,122 B2 | 7/2009 | Oliver et al. | |
| 7,631,362 B2 | 12/2009 | Ramsey | |
| 7,668,769 B2 | 2/2010 | Baker et al. | |
| 7,813,937 B1 | 10/2010 | Pathria et al. | |
| 7,835,919 B1 | 11/2010 | Bradley et al. | |
| 7,853,469 B2 | 12/2010 | Maitland et al. | |
| 8,015,108 B2 | 9/2011 | Haggerty et al. | |
| 8,027,439 B2 | 9/2011 | Zoldi et al. | |
| 8,036,981 B2* | 10/2011 | Shirey | G06Q 20/04 705/38 |
| 8,041,597 B2 | 10/2011 | Li et al. | |
| 8,090,648 B2 | 1/2012 | Zoldi et al. | |
| 8,458,069 B2 | 6/2013 | Adjaoute | |
| 8,484,301 B2 | 7/2013 | Wilson et al. | |
| 8,548,137 B2 | 10/2013 | Zoldi et al. | |
| 8,555,077 B2 | 10/2013 | Davis et al. | |
| 8,561,007 B2 | 10/2013 | Challenger et al. | |
| 8,572,736 B2 | 10/2013 | Lin | |
| 8,744,979 B2 | 6/2014 | Sundelin et al. | |
| 8,805,737 B1 | 8/2014 | Chen et al. | |
| 9,264,442 B2 | 2/2016 | Bart et al. | |
| 9,400,879 B2 | 7/2016 | Tredoux et al. | |
| 9,721,296 B1 | 8/2017 | Chrapko | |
| 9,898,741 B2 | 2/2018 | Siegel et al. | |
| 10,339,606 B2 | 7/2019 | Gupta | |
| 2002/0188533 A1 | 12/2002 | Sanchez et al. | |
| 2002/0194119 A1* | 12/2002 | Wright | G06Q 30/0609 705/38 |
| 2003/0009495 A1 | 1/2003 | Adjaoute | |
| 2003/0084449 A1 | 5/2003 | Chane et al. | |
| 2003/0158751 A1 | 8/2003 | Suresh et al. | |
| 2004/0073634 A1 | 4/2004 | Haghpassand | |
| 2004/0111363 A1 | 6/2004 | Trench et al. | |
| 2004/0153555 A1 | 8/2004 | Haverinen et al. | |
| 2004/0225473 A1* | 11/2004 | Aoki | G06Q 20/40 702/181 |
| 2006/0041464 A1 | 2/2006 | Powers et al. | |
| 2006/0149674 A1 | 7/2006 | Cook et al. | |
| 2006/0212350 A1 | 9/2006 | Ellis et al. | |
| 2007/0067853 A1 | 3/2007 | Ramsey | |
| 2007/0112667 A1* | 5/2007 | Rucker | G06Q 40/025 705/38 |
| 2007/0124246 A1 | 5/2007 | Lawyer et al. | |
| 2007/0174164 A1* | 7/2007 | Biffle | G06Q 40/00 705/35 |
| 2007/0174214 A1 | 7/2007 | Welsh et al. | |
| 2007/0239604 A1 | 10/2007 | O'Connell et al. | |
| 2008/0086365 A1 | 4/2008 | Zollino et al. | |
| 2008/0104101 A1 | 5/2008 | Kirshenbaum et al. | |
| 2008/0162259 A1 | 7/2008 | Patil et al. | |
| 2008/0281743 A1* | 11/2008 | Pettit | G06Q 20/40 705/35 |
| 2009/0307028 A1* | 12/2009 | Eldon | G06Q 30/06 705/37 |
| 2010/0027527 A1 | 2/2010 | Higgins et al. | |
| 2010/0082751 A1 | 4/2010 | Meijer et al. | |
| 2010/0115610 A1 | 5/2010 | Tredoux et al. | |
| 2010/0125470 A1 | 5/2010 | Chisholm | |
| 2010/0191634 A1 | 7/2010 | Macy et al. | |
| 2010/0228656 A1 | 9/2010 | Wasserblat et al. | |
| 2010/0305993 A1 | 12/2010 | Fisher | |
| 2011/0016041 A1 | 1/2011 | Scragg | |
| 2011/0035440 A1 | 2/2011 | Henkin et al. | |
| 2011/0055196 A1 | 3/2011 | Sundelin et al. | |
| 2011/0055264 A1 | 3/2011 | Sundelin et al. | |
| 2011/0238566 A1 | 9/2011 | Santos | |
| 2011/0258049 A1 | 10/2011 | Ramer et al. | |
| 2011/0276468 A1* | 11/2011 | Lewis | G06Q 20/40 705/38 |
| 2011/0307382 A1* | 12/2011 | Siegel | G06Q 20/4016 705/44 |
| 2012/0047072 A1* | 2/2012 | Larkin | G06Q 20/3255 705/44 |
| 2012/0137367 A1 | 5/2012 | Dupont et al. | |
| 2012/0203698 A1 | 8/2012 | Duncan et al. | |
| 2012/0226613 A1 | 9/2012 | Adjaoute | |
| 2013/0018796 A1 | 1/2013 | Kolhatkar et al. | |
| 2013/0204755 A1 | 8/2013 | Zoldi et al. | |
| 2013/0305357 A1 | 11/2013 | Ayyagari et al. | |
| 2014/0082434 A1 | 3/2014 | Knight et al. | |
| 2014/0149128 A1 | 5/2014 | Getchius | |
| 2014/0180974 A1 | 6/2014 | Kennel et al. | |
| 2014/0279803 A1 | 9/2014 | Burbank et al. | |
| 2015/0046224 A1 | 2/2015 | Adjaoute | |
| 2015/0161609 A1* | 6/2015 | Christner | G06Q 20/4016 705/44 |
| 2015/0193263 A1 | 7/2015 | Nayyar | |
| 2015/0279155 A1 | 10/2015 | Chun et al. | |
| 2015/0348042 A1 | 12/2015 | Jivraj et al. | |
| 2016/0260102 A1* | 9/2016 | Nightengale | G06Q 20/20 |
| 2017/0006141 A1 | 1/2017 | Bhadra | |
| 2017/0083386 A1 | 3/2017 | Wing et al. | |
| 2017/0270534 A1 | 9/2017 | Zoldi et al. | |
| 2017/0347283 A1 | 11/2017 | Kodaypak | |
| 2018/0040064 A1 | 2/2018 | Grigg et al. | |
| 2018/0048710 A1 | 2/2018 | Altin | |
| 2018/0151045 A1 | 5/2018 | Kim et al. | |
| 2018/0182029 A1 | 6/2018 | Vinay | |
| 2018/0208448 A1 | 7/2018 | Zimmerman et al. | |
| 2018/0253657 A1 | 9/2018 | Zhao et al. | |
| 2019/0156417 A1 | 5/2019 | Zhao et al. | |
| 2019/0213498 A1 | 7/2019 | Adjaoute | |
| 2019/0236695 A1 | 8/2019 | McKenna et al. | |
| 2019/0250899 A1 | 8/2019 | Riedl et al. | |
| 2019/0265971 A1 | 8/2019 | Behzadi et al. | |
| 2019/0278777 A1 | 9/2019 | Malik et al. | |

FOREIGN PATENT DOCUMENTS

| | | |
|---|---|---|
| EP | 0631453 | 12/2001 |
| WO | 9406103 | 3/1994 |
| WO | 9501707 | 1/1995 |
| WO | 9628948 | 9/1996 |
| WO | 9703533 | 1/1997 |
| WO | 98/32086 | 7/1998 |

OTHER PUBLICATIONS

Data Compaction, 2013, Wikipedia, printed through www.archive.org (date is in the URL in YYYYMMDD format) (Year:2013).

Data Consolidation, 2014, Techopedia, printed through www.archive.org (date is in the URL in YYYYMMDD format) (Year:2014).

Data Mining Mar. 31, 2014. Wikipedia, Printed through www.archive.org, date is in the URL in YYYMMDD format (Year:2014).

Data Warehousing—Metadata Concepts, Mar. 24, 2014, TutorialsPoint, printed through www.archive.org (Date is in URP in YYYMMDD format) (Year:2014).

Dave, Kushal, Steve Lawrence, and David M. Pennock. "Mining the peanut gallery: Opinion extration and semantic classification of product reviews." Proceedings of the 12th international conference on WorldWide Web. ACM. 2003.

(56) References Cited

OTHER PUBLICATIONS

I Need Endless Rolling List, 2007, QuinStreet, Inc. (Year: 2007).
Office Action From U.S. Appl. No. 14/243,097 (dated Jun. 16, 2015).
Office Action From U.S. Appl. No. 14/243,097 (dated Nov. 5, 2018).
Office Action From U.S. Appl. No. 14/522,463 (dated Dec. 1, 2015).
Office Action From U.S. Appl. No. 14/522,463 (dated Feb. 11, 2019).
Office Action From U.S. Appl. No. 14/522,463 (dated Jun. 20, 2018).
Office Action From U.S. Appl. No. 14/522,463 (dated Jun. 5, 2015).
Office Action From U.S. Appl. No. 14/522,463 (dated Oct. 10, 2018).
Office Action From U.S. Appl. No. 14/613,383 (dated Apr. 23, 2018).
Office Action From U.S. Appl. No. 14/613,383 (dated Aug. 14, 2015).
Office Action From U.S. Appl. No. 14/613,383 (dated Dec. 13, 2018).
Yang,Yiming. "Expert network: Effective and efficient learning from human decisions in text categorization and retrieval." Proceedings of the 17th annual international ACM SIGIR conference on Research and development in information retrieval Springer-Verlag New York, Inc., 1994.
"2000 Internet Fraud Statistics," National Fraud Information Center web site, http://www.fraud.org, 2001.
"AXENT Technologies' NetProwler™ and Intruder Alert™", Hurwitz Report, Hurwitz Group, Inc., Sep. 2000.
"CBA 1994 Fraud Survey," California Bankers Association web site, http://www.calbankers.com/legal/fraud.html, Jun. 1996.
"Check Fraud Against Businesses Proliferates," Better Business Bureau web site, http://www.bbb.org/library/checkfraud.asp, 2000.
"Check Fraud Statistics," National Check Fraud Center web site, http://www.ckfraud.org/statistics.html, Date Unkonwn.
"Consumers and Business Beware of Advance Fee Loan and Credit Card Fraud," Better Business Bureau web site, http://www.bbb.org/library/feeloan.asp, 20003.
"CyberSource Fraud Survey," CyberSource, Inc., web site, http://www.cybersource.com/solutions/risk_management/us_fraud_survey.xml, Date Unknown.
"eFalcon Helps E-Merchants Control Online Fraud," Financial Technology Insights Newsletter, HNC Software, Inc., Aug. 2000.
"Guidelines to Healthcare Fraud," National health care Anti-Fraud Association web site, http://www.nhcaa.org/factsheet_guideline.html, Nov. 19, 1991.
"Health Insurance Fraud," http://www.helpstopcrime.org, Date Unknown.
"HIPPA Solutions: Waste, Fraud, and Abuse," ViPS, Inc., web site, http://www.vips.com/hippa/combatwaste.html, 2001.
"HNC Insurance Solutions Introduces Spyder Software for Healthcare Fraud and Abuse Containment," HNC Software, Inc., press release, Dec. 4, 1998.
"Homeowners Insurance Fraud," http://www.helpstopcrime.org, Date Unknown.
"Insurance Fraud: The Crime You Pay for," http://www.insurancefraud.org/facts.html, Date Unknown.
"PRISM FAQ", Nestor, Inc., www.nestor.com, Date Unknown.
"SET Secure Electronic Transaction Sepcification," Book 1: Business Description, May 1997.
"Telemarketing Fraud Revisited," Better Business Bureau web site, http://www.bbb.org/library/tele.asp, 2000.
"The Impact of Insurance Fraud," Chapter 5, Ohio Insurance Facts, Ohio Insurance Institute, 2000.
"VeriComp™ Claimant," HNC Software, Inc., web site, 2001.
"What is Insurance Fraud?," http://www.helpstopcrime.rog, Date Unkonwn.
"Wireless Fraud FAQ," World of Wireless Communications web site, http://www.wow-com/consumer/faq/articles.cfm?textonly=1&Id=96, Date Unknown.
"Workers Compensation Fraud," http://www.helpstopcrime.org, Date Unknown.
A. Aadjaoute, "Responding to the e-Commerce Promise with Non-Algorithmic Technology," Handbook of E-Business, Chapter F2, edited by J. Keyes, Jul. 2000.
A. Valdes and H. Javitz,"The SRI IDES Statistical Anomaly Detector," May 1991.
D. Anderson, T. Frivold, and A. Valdes, "NExt-Generation intrusion Detection Expert System (NIDES): A Summary, " SRI Computer Science Laboratory technical report SRI-CSL-95-07, May 1995.
Debar et al., "Neural network Component for an Intrustion Detection System", Proceedings for the Computer Society Symposium on Research in Security and Privacy, vol. SYMP.13, May 4, 1992, 240-250.
Denault et al., "Intrusion Detection: approach and performance issues of the SECURENET system", Computers and Security, 13 (1994), 495-508.
John J. Xenakis, 1990, InformationWeek, 1990. n296,22.
K. G. DeMarrais, "Old-fashioned check fraud still in vogue," Bergen record Corp. web site, http://www.bergen.com/biz/savvy24200009242.htm, Sep. 24, 2000.
M B. Guard, "Calling Card Fraud—Travelers Beward!," http://www.bankinfo.com/security/scallingcardhtml, Jun. 11, 1998.
Maria Seminerio, Dec. 13, 1999, PC week, 99.
Office Action from U.S. Appl. No. 09/810,313 (dated Jun. 22, 2005).
Office Action From U.S. Appl. No. 14/454,749 (dated Feb. 3, 2017).
Office Action From U.S. Appl. No. 14/514,381 (dated Dec. 31, 2014).
Office Action From U.S. Appl. No. 14/514,381 (dated May 13, 2015).
Office Action From U.S. Appl. No. 14/514,381 (dated Jan. 10, 2018).
Office Action From U.S. Appl. No. 14/514,381 (dated Apr. 2, 2018).
Office Action From U.S. Appl. No. 14/815,848 (dated Sep. 30, 2015).
Office Action From U.S. Appl. No. 14/815,848 (dated Mar. 14, 2016).
Office Action From U.S. Appl. No. 14/815,934 (dated Sep. 30, 2015).
Office Action From U.S. Appl. No. 14/815,934 (dated Feb. 11, 2016).
Office Action From U.S. Appl. No. 14/815,934 (dated Sep. 23, 2016).
Office Action From U.S. Appl. No. 14/815,934 (dated Apr. 7, 2017).
Office Action From U.S. Appl. No. 14/815,940 (dated Oct. 1, 2015).
Office Action From U.S. Appl. No. 14/815,940 (dated Dec. 28, 2017).
Office Action From U.S. Appl. No. 14/929,341 (dated Dec. 22, 2015).
Office Action From U.S. Appl. No. 14/929,341 (dated Feb. 4, 2016).
Office Action From U.S. Appl. No. 14/929,341 (dated Aug. 19, 2016).
Office Action From U.S. Appl. No. 14/929,341 (dated Jul. 31, 2018).
Office Action From U.S. Appl. No. 14/938,844 (dated Apr. 11, 2016).
Office Action From U.S. Appl. No. 14/938,844 (dated Jan. 25, 2017).
Office Action From U.S. Appl. No. 14/938,844 (dated May 1, 2017).
Office Action From U.S. Appl. No. 14/938,844 (dated Aug. 23, 2017).
Office Action From U.S. Appl. No. 14/935,742 (dated Mar. 2, 2016).
Office Action From U.S. Appl. No. 14/935,742 (dated Sep. 22, 2016).
Office Action From U.S. Appl. No. 14/935,742 (dated Mar. 29, 2017).
Office Action From U.S. Appl. No. 14/935,742 (dated May 31, 2017).
Office Action From U.S. Appl. No. 14/941,586 (dated Jan. 5, 2017).
Office Action From U.S. Appl. No. 14/941,586 (dated May 2, 2017).
Office Action From U.S. Appl. No. 14/956,392 (dated Feb. 2, 2016).
Office Action From U.S. Appl. No. 14/956,392 (dated Mar. 28, 2016).
Office Action From U.S. Appl. No. 14/956,392 (dated Nov. 3, 2016).

(56) References Cited

OTHER PUBLICATIONS

Office Action From U.S. Appl. No. 14/956,392 (dated May 3, 2017).
Office Action From U.S. Appl. No. 14/986,534 (dated May 20, 2016).
Office Action From U.S. Appl. No. 14/986,534 (dated Sep. 7, 2017).
Office Action From U.S. Appl. No. 14/517,771 (dated Jul. 15, 2015).
Office Action From U.S. Appl. No. 14/517,771 (dated Dec. 31, 2015).
Office Action From U.S. Appl. No. 14/517,771 (dated Sep. 8, 2016).
Office Action From U.S. Appl. No. 14/517,771 (dated Sep. 20, 2018).
Office Action From U.S. Appl. No. 14/517,863 (dated Feb. 5, 2015).
Office Action From U.S. Appl. No. 14/517,863 (dated Aug. 10, 2015).
Office Action From U.S. Appl. No. 14/675,453 (dated Jun. 9, 2015).
Office Action From U.S. Appl. No. 14/517,872 (dated Jan. 14, 2015).
Office Action From U.S. Appl. No. 14/517,872 (dated Jul. 31, 2015).
Office Action From U.S. Appl. No. 14/520,361 (dated Feb. 2, 2015).
Office Action From U.S. Appl. No. 14/520,361 (dated Jul. 17, 2015).
Office Action From U.S. Appl. No. 14/520,361 (dated Jul. 11, 2018).
Office Action From U.S. Appl. No. 14/521,386 (dated Jan. 29, 2015).
Office Action From U.S. Appl. No. 14/521,386 (dated Nov. 1, 2018).
Office Action From U.S. Appl. No. 14/521,667 (dated Jan. 2, 2015).
Office Action From U.S. Appl. No. 14/521,667 (dated Jun. 26, 2015).
Office Action From U.S. Appl. No. 14/634,786 (dated Oct. 2, 2015).
Office Action from U.S. Appl. No. 09/810,313 (dated Mar. 24, 2006).
Office Action from U.S. Appl. No. 09/810,313 (dated Nov. 23, 2004).
Office Action from U.S. Appl. No. 11/455,146 (dated Sep. 29, 2009).
P.A. Porras and P.G. Neumann, "EMERALD: Event Monitoring Enabling Responses to Anomalous Live Disturbances," National Information Systems Security Conference, Oct. 1997.
P.E. Proctor, "Computer Misuse Detection System (CMDSTM) Concpets," SAIC Science and technology Trends, pp. 137-145, Dec. 1996.
S. Abu-Hakima, M. ToLoo, and T. White, "A Multi-Agent Systems Approach for Fraud Detection in Personal Communication Systems," Proceedings of the Fourteenth National Conference on Artificial Intelligence (AAAI-97), pp. 1-8, Jul. 1997.
Teng et al., "Adaptive real-time anomaly detection using inductively generated sequential patterns", Proceedings of the Computer Society Symposium on research in Security and Privacy, vol. SYMP. 11, May 7, 1990, 278-284.
Office Action from U.S. Appl. No. 14/522,463 (dated Oct. 3, 2019).
Office Action from U.S. Appl. No. 14/522,463 (dated Jul. 18, 2019).
Office Action From U.S. Appl. No. 16/205,909 (dated Dec. 27, 2019).
Office Action From U.S. Appl. No. 16/205,909 (dated Sep. 27, 2019).
Office Action From U.S. Appl. No. 16/398,917 (dated Sep. 26, 2019).
Office Action From U.S. Appl. No. 15/947,790 (dated Nov. 18, 2019).
Office Action From U.S. Appl. No. 14/525,273 (dated Jun. 26, 2018).
Office Action From U.S. Appl. No. 14/525,273 (dated Feb. 9, 2015).
Office Action From U.S. Appl. No. 14/525,273 (dated May 19, 2015).
Office Action From U.S. Appl. No. 15/968,568 (dated Sep. 16, 2019).
Office Action From U.S. Appl. No. 15/961,752 (dated Oct. 3, 2019).
Office Action From U.S. Appl. No. 14/673,895 (dated Oct. 30, 2015).
Office Action From U.S. Appl. No. 14/673,895 (dated Feb. 12, 2016).
Office Action From U.S. Appl. No. 14/673,895 (dated Jul. 14, 2017).
Office Action From U.S. Appl. No. 14/673,895 (dated Oct. 2, 2017).
Office Action From U.S. Appl. No. 14/690,380 (dated Jul. 15, 2015).
Office Action From U.S. Appl. No. 14/690,380 (dated Dec. 3, 2015).
Office Action From U.S. Appl. No. 14/690,380 (dated Jun. 30, 2016).
Office Action From U.S. Appl. No. 14/690,380 (dated Nov. 17, 2016).
Office Action From U.S. Appl. No. 14/690,380 (dated Jun. 27, 2017).
Office Action From U.S. Appl. No. 14/690,380 (dated Nov. 20, 2017).
"10 Popular health care provider fraud schemes" by Charles Piper, Jan./Feb. 2013, Fraud Magazine, www.fraud-magazine.com.
Report to the Nations on Occupational Fraud and Abuse, 2012 Global Fraud Study, copyright 2012, 76 pp., Association of Certified Fraud Examiners, Austin, TX.
Big Data Developments in Transaction Analytics, Scott Zoldi, Credit Scoring and Credit Control XIII Aug. 28-30, 2013 Fair Isaacs Corporation (FICO).
Credit card fraud detection using artificial neural networks tuned by genetic algorithms, Dissertation: Carsten A. W. Paasch, Copyright 2013 Proquest, LLC.
Fraud Detection Using Data Analytics in the Healthcare Industry, Discussion Whitepaper, ACL Services Ltd., (c) 2014, 8pp.
Fraud Detection of Credit Card Payment System by Genetic Algorithm, K.RamaKalyani, D. UmaDevi Department of Computer Science, Sri Mittapalli College of Engineering, Guntur, AP, India., International Journal of Scientific & Engineering Research vol. 3, Issue 7, Jul. 2012 1, ISSN 2229-5518.
Healthcare Fraud Detection, http://IJINIIW.21ct.com'solutions/healthcare-fraud-detection/, (c) 2013 21CT, Inc.
Prevent Real-time fraud prevention, brochure, Brighterion, Inc. San Francisco, CA.
"Agent-Based modeling: Methods and Techniques for Simulating Human Systems", Eric Bonabeau, Icosystem Corporation, 545 Concord Avenue, Cambridge, MA 02138, 7280-7287; PNAS; May 14, 2002; vol. 99; suppl. 3; www.pnas.org/cgi/doi/10.1073/pnas.082080899.
Office Action From U.S. Appl. No. 16/168,566 (dated Mar. 4, 2020).
Office Action From U.S. Appl. No. 14/522,463 (dated Mar. 24, 2020).
Office Action From U.S. Appl. No. 16/205,909 (dated Apr. 22, 2020).
Office Action From U.S. Appl. No. 16/398,917 (dated Mar. 11, 2020).
Raid, Feb. 28, 2014, www.prepressure.com, printed through www.archive.org (Year: 2014).
Office Action from U.S. Appl. No. 16/226,246 (dated Aug. 4, 2020).
Office Action From U.S. Appl. No. 16/264,144 (dated Oct. 16, 2020).
Office Action From U.S. Appl. No. 16/168,566 (dated Dec. 18, 2020).
Office Action From U.S. Appl. No. 15/866,563 (dated Nov. 27, 2020).
Office Action From U.S. Appl. No. 16/168,566 (dated Sep. 9, 2020).
Office Action From U.S. Appl. No. 16/674,980 (dated Sep. 3, 2020).
Office Action From U.S. Appl. No. 16/184,894 (dated Sep. 21, 2020).
Office Action From U.S. Appl. No. 16/592,249 (dated Sep. 14, 2020).
Office Action From U.S. Appl. No. 16/601,226 (dated Sep. 2, 2020).
Office Action From U.S. Appl. No. 16/856,131 (dated Sep. 24, 2020).
Office Action From U.S. Appl. No. 16/679,819 (dated Sep. 25, 2020).
Office Action From U.S. Appl. No. 16/677,458 (dated Sep. 24, 2020).

* cited by examiner

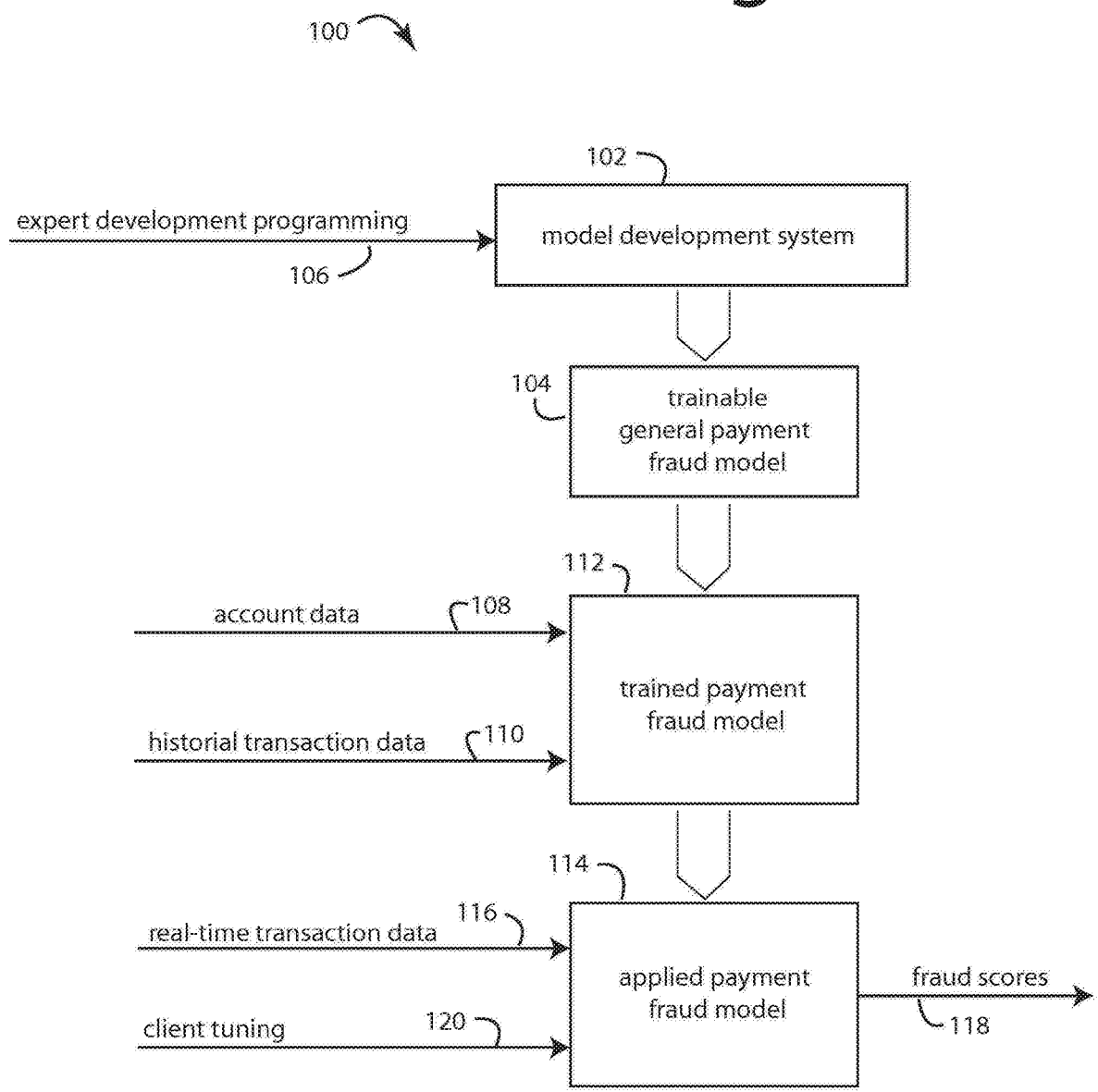

Fig. 13

Profile (1300, 1302)

|  | Field₁ (mcc) | Field₂ (zipcode) | Field₃ (amount) | ... | Fieldₙ |
|---|---|---|---|---|---|
| January |  |  |  |  |  |
| February |  |  |  |  |  |
| ... |  |  |  |  |  |
| December |  |  |  |  |  |
| Thanksgiving |  |  |  |  |  |
| Christmas |  |  |  |  |  |

| Zipcode | Frequency |
|---|---|
| 94104 | 9 |
| 94105 | 7 |
| 94110 | 3 |
|  | 19 |

| Minimum | 5.80 |
|---|---|
| Maximum | 274.50 |
| Average | 64.67 |
| Sum | 664.86 |

1304 — Example 1: Dec 5 2013 | grocery | 94110 | 90.54 | ...
risk score: ↑ unknown | ↓ known | ↓ (avg) → low risk

1306 — Example 2: Dec 5 2013 | grocery | 94108 | 64.87 | ...
risk score: ↓ known | ↑ unknown | ↓ (avg) → low risk

1308 — Example 3: Dec 5 2013 | flight | 32541 | 765.98 | ...
risk score: ↑ unknown | ↑ unknown far away | ↑ (high) → high risk

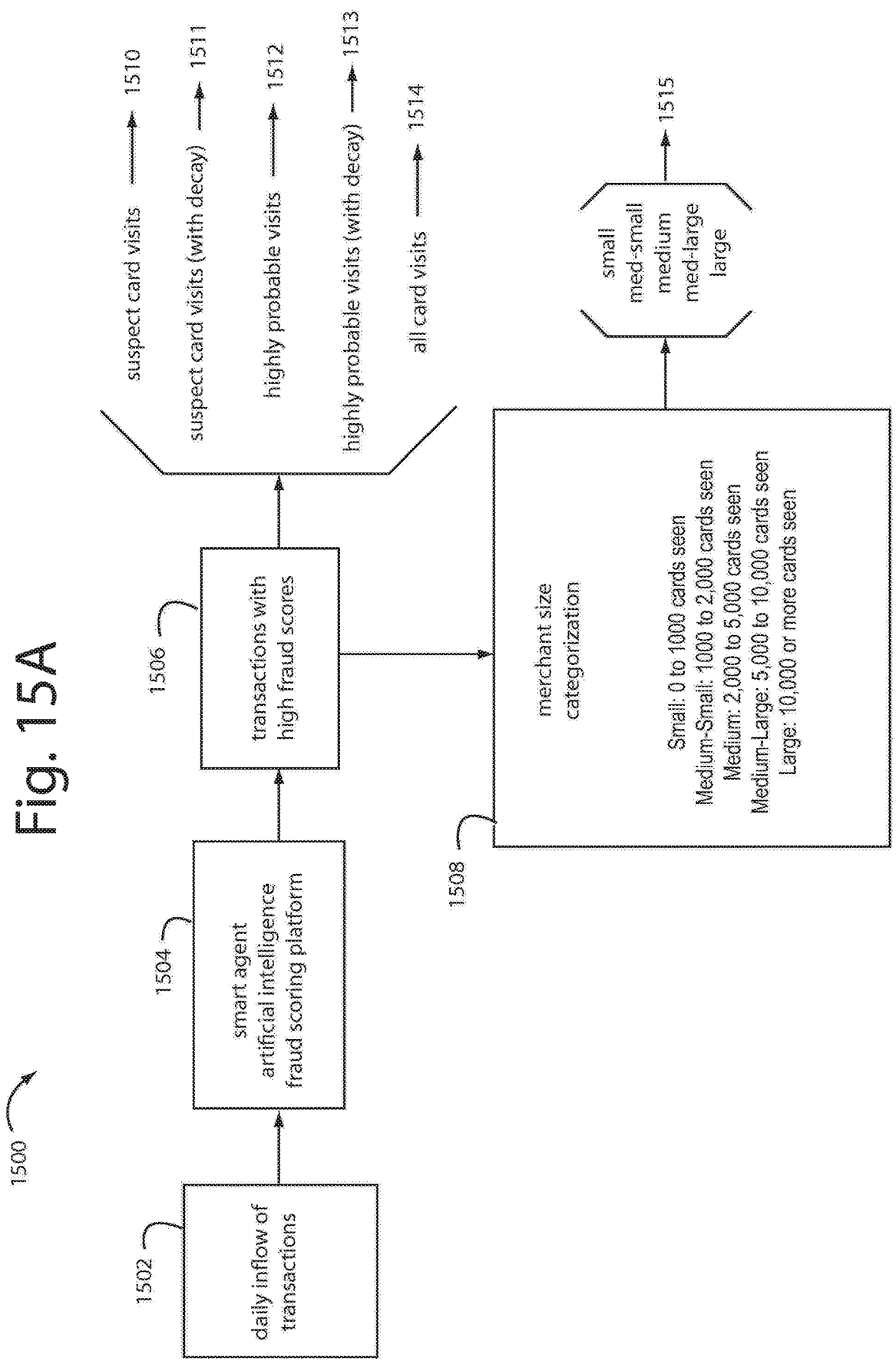

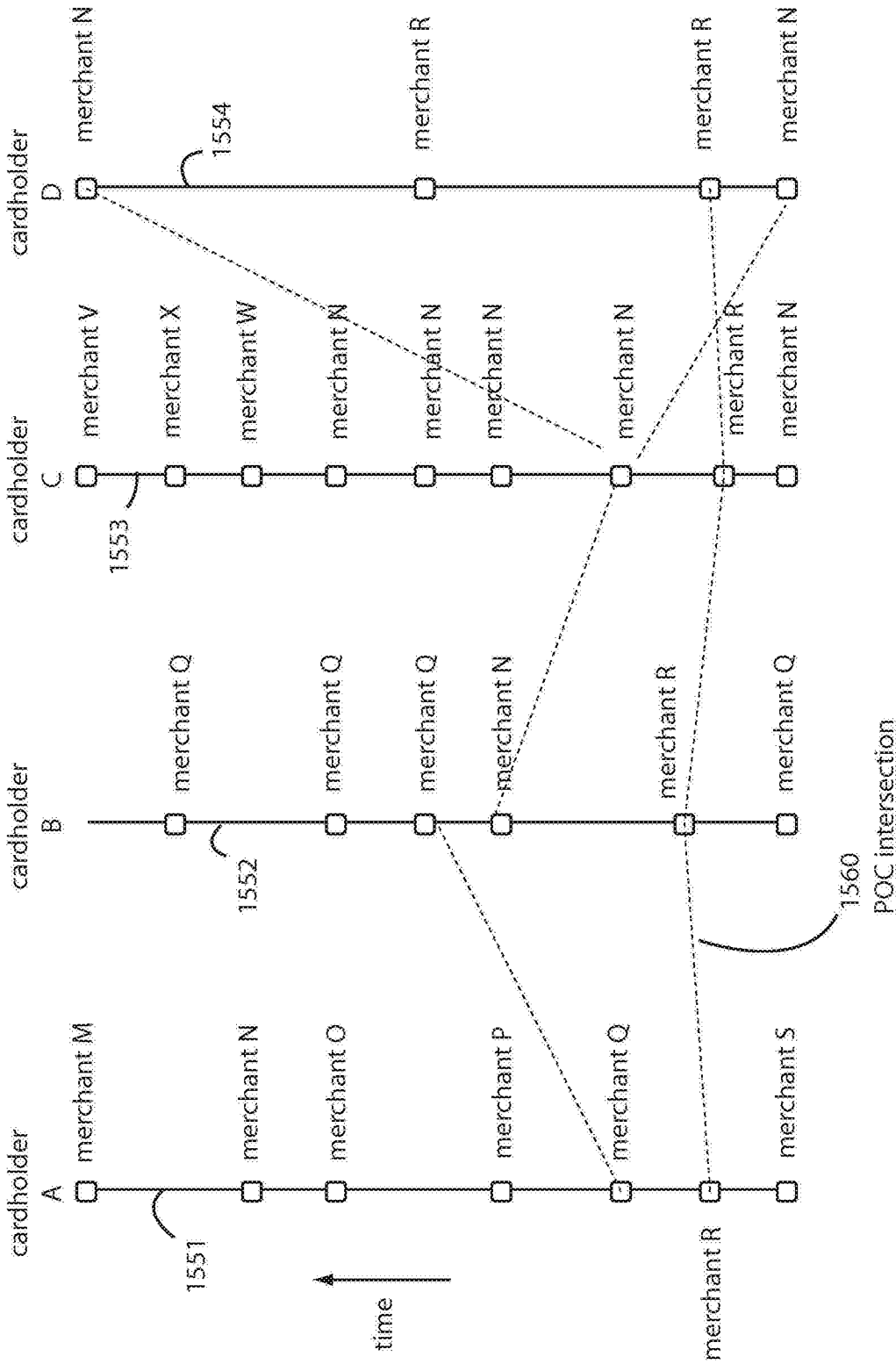

DATA BREACH DETECTION

RELATED APPLICATION

The current patent application is a continuation patent application which claims priority benefit with regard to all common subject matter to identically-titled U.S. patent application Ser. No. 14/525,273, filed Oct. 28, 2014, which is hereby incorporated by reference in its entirety into the current patent application.

BACKGROUND OF THE INVENTION

Field of the Invention

The present invention relates to artificial intelligence systems, and more particularly to data breach detection systems with adaptive "smart agents" that learn, adapt and evolve with the behaviors of their corresponding subjects by the transactions they engage in, and that can evaluate if a data breach has occurred at a "point-of-compromise" somewhere in the payment network.

Background

Several major retailers have recently announced that "hackers" have breached their systems and gotten away with millions of cardholder accounts and passwords. The retailers inadequately advise their customers to change their bankcard passwords, and the involved card issuers are independently initiating wholesale card replacements. Not good, for anyone.

Faster detections of data breaches are needed to limit the damage. The database breaches just keep on coming, resulting in painful losses and brand damage for issuers and merchants. Cybercriminals are using sophisticated hacking, skimming, employee-insider, and malware methods to hack into supposedly secure systems and steal payment card data and credentials. The millions of compromised payment cards will go stale in a few days or weeks, so the criminals quickly sell the data on the black market. These get converted into counterfeit cards that will work at point of sale (POS) terminals and online, mobile, or call-center card-not-present (CNP) channels.

TABLE

Recent Card Data Compromises

| Company | Announced | Method | Records compromised |
|---|---|---|---|
| P.F. Chang's China Bistro | June 2014 | External— malware | Undetermined quantity of payment card data. |
| Home Depot | May 2014 | Internal | Thirty thousand customer records including name, address, phone number, payment card number, expiration date. |
| Spec's | March 2014 | External— malware | Payment card and/or checking account information for 550,000 customers. |
| Michael's | January 2014 | External— malware | Payment card data for 3 million customers. |
| Target | December 2013 | External— malware | Payment card data for 40 million consumers as well as personal information for another 70 million Target customers. |
| CorporateCar Online | November 2013 | External— hacking | Attackers were able steal an unencrypted database containing PIT and credit card details for 850,000 high-net-worth individuals and celebrities. |
| Adobe | October 2013 | External— hacking | Personal information of 2.9 million customers, including names and credit and debit card numbers; source code for popular Adobe products also stolen. |

Proactive detection of data compromises can be very challenging for issuers and merchants alike. When the cardholders themselves detect unauthorized activity on their card a month after the fact when they get their statements, their usual first step is to contact the issuer to dispute the charge.

Many large issuers have analytic systems already in place that aggregate consumer disputes, and try to tie them back to some common point, e.g., a retailer. But millions of consumers each initiating multiple transactions per day on their cards complicates determining the locations of any data compromises. Smaller issuers are more dependent on the point-of-compromise alerts that come from the payment networks. These alerts often lag the large issuers' knowledge of a breach by three to four weeks due to the overhead incurred by networks' obligation to be 100% positive of the breach location before raising the red flag.

The best analytic approaches to detecting data breaches employ machine learning and artificial intelligence technologies to inspect possibly fraudulent reports, and attempt to tie the seemingly random fraud back to some common point-of-purchase. The ideal models learn and train themselves on an ongoing basis, to accelerate and quicken compromise detection.

Data breaches are disruptive, their negative impacts have steadily increased for the last five years as cybercriminals' tactics escalate in sophistication. Such breaches are very costly. Merchants suffer from brand damage and revenue loss. Target's fourth quarter earnings plunged significantly as shoppers went elsewhere in the wake of Target's breach.

The financial impacts are compounded in the form of fines for being out of compliance with the Payment Card Industry Data Security Standards (PCI-DSS).

The card issuers bear the liability for the fraud losses that result from the counterfeit cards that are created using data stolen in a breach. Cardholders will often also reduce their use of the affected cards, further driving loses in revenues for the issuer. Recently, as many as 38% of American consumers who experienced fraud subsequently reduced their use of the impacted card.

When it comes to fraud detection, time is money. If a data compromise can be detected quickly, issuers can take more effective steps to minimize both their losses and the direct impact on consumers.

Issuers now employ a number of creative solutions to the problem. One top-five issuer has a $10-million budget dedicated to infiltrating the underground forums where criminals sell stolen data. They buy back their own card numbers hoping to use the experience identify the compromise locations more quickly.

Analytics are now being used by more firms. Issuers, payment networks, and processors are continually looking for better more effective methods of compromise detection.

A patchwork of state regulations obliges businesses in forty-seven states to notify consumers of data compromises. But there are no equivalent set of mandates for businesses to provide the public with the details of how the breaches occur. Target breach came under a bright very public spotlight, and a clearer picture of the criminals' methodology came to light.

In mid-2013, Fazio Mechanical, one of Target's small heating and air conditioning (HVAC) vendors, unwittingly downloaded a keylogging Trojan. Such malware records data entered by users and sends the captured data to the cybercriminals' command and control center. Fazio was using a free, consumer-grade anti-malware software package that only did on-demand scans, so the malware went undetected. The keylogging Trojan captured the data they keyed into the compromised workstation, including the vendor's credentials used for logging into Target's Ariba billing system.

That enabled the criminals to log into Target's billing system, and to hack their way over to a POS production data. A clear breakdown in Target's data security practices. Once there, they implemented a variety of BlackPOS malware, a memory scraping malware that is available for purchase on underground web forums for around $2,000. On Nov. 27, 2013, the BlackPOS began collecting data. On December 2, the criminals began the data exfiltration process. The criminals began testing and trying the data during the first week of December. Once they determined the data was valid and useable, they began posting significant quantities of data to underground forums sometime around the second week of December. On December 15, Target removed the bulk of the malware. But it missed a portion of the malware in the initial scrub. The malware removal was completed on December 18.

The Target breach was particularly difficult to detect for a number of reasons, even given the large number of cards that were compromised and subsequently sold on the black market. The breach took place around Black Friday, a time when fraud rates typically escalate along with purchase volume. The strip mall proximity of many merchants at which a consumer will shop sequentially can create false echoes that can lead the issuer to initially attribute the breach to the wrong culprit. The sheer volume of breaches that are taking place these days can often lead to the same card number being sold multiple times in the black market, creating another challenge in isolating the breaches to a particular merchant. All these issues were further magnified in the Target breach. The criminals also made available the zip code of the store in which the compromised card data was originally used by the genuine consumer. With this data available to them, the criminals were able to manufacture counterfeit cards that could be used in the same geographic location, further impeding issuers' detection efforts.

Herein we use the term "smart agent" to describe our own unique construct in a fraud detection system. Intelligent agents, software agents, and smart agents described in the prior art and used in conventional applications are not at all the same.

Sometimes all we know about someone is what can be inferred by the silhouettes and shadows they cast and the footprints they leave. Who is behind a credit card or payment transaction is a lot like that. We can only know and understand them by the behaviors that can be gleaned from the who, what, when, where, and (maybe) why of each transaction and series of them over time.

Cardholders will each individually settle into routine behaviors, and therefore their payment card transactions will follow those routines. All cardholders, as a group, are roughly the same and produce roughly the same sorts of transactions. But on closer inspection the general population of cardholders will cluster into various subgroups and behave in similar ways as manifested in the transactions they generate.

Card issuers want to encourage cardholders to use their cards, and want to stop and completely eliminate fraudsters from being able to pose as legitimate cardholders and get away with running transactions through to payment. So card issuers are challenged with being able to discern who is legitimate, authorized, and presenting a genuine transaction, from the clever and aggressive assaults of fraudsters who learn and adapt all too quickly. All the card issuers have before them are the millions of innocuous transactions flowing in every day.

What is needed is a fraud management system that can tightly follow and monitor the behavior of all cardholders and act quickly in real-time when a fraudster is afoot.

SUMMARY OF THE INVENTION

Briefly, an artificial intelligence data breach detection embodiment of the present invention detects breaches of secure payment card data by analyzing real-time transaction records as they flow in. On-going searches are made by analyzing the high risk transactions daily and comparing them with behaviors days, weeks, and month. A table of cards with the first known fraud dates is created. An investigation is launched into the merchants with suspect transactions. A uniform key is created to keep track of those merchants in later processes and to collect summary information about them. The matrix of card and merchants is evaluated, first by summing over the rows and then the columns to create a scoring criteria that looks over more than one statistic at a time. These scores are then balanced, adjusted, and combined to have singular final score. A table for each outlet, and initial scoring criteria is created, including the number of suspect cards that have visited them, the sum of the percentages of those card visits, and other more advanced strategies. Several different statistics are used in the scoring mechanisms.

Constituent transactions with high risk fraud scores are sorted into a table according to the transaction date, cardholder, and merchant. The table data is scored according to suspected card visits, highly probable visits, and all card visits. The scores are normalized according to merchant size grouping through the use of multipliers. The normalized scores are summed together day-by-day into a final score. A timely warning of an underlying and expanding security rupture caused by a merchant data breach is issued for damage control.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 1 is functional block diagram of an artificial intelligence fraud management solution embodiment of the present invention;

FIG. 13 is a diagram representing a simplified smart agent profile and how individual constituent datapoints are compared to running norms and are accumulated into an overall risk score;

FIGS. 15A-15E represent the statistics and computations steps included in a data breach detection system embodiment of the present invention.

DETAILED DESCRIPTION OF THE INVENTION

Figure 2A:
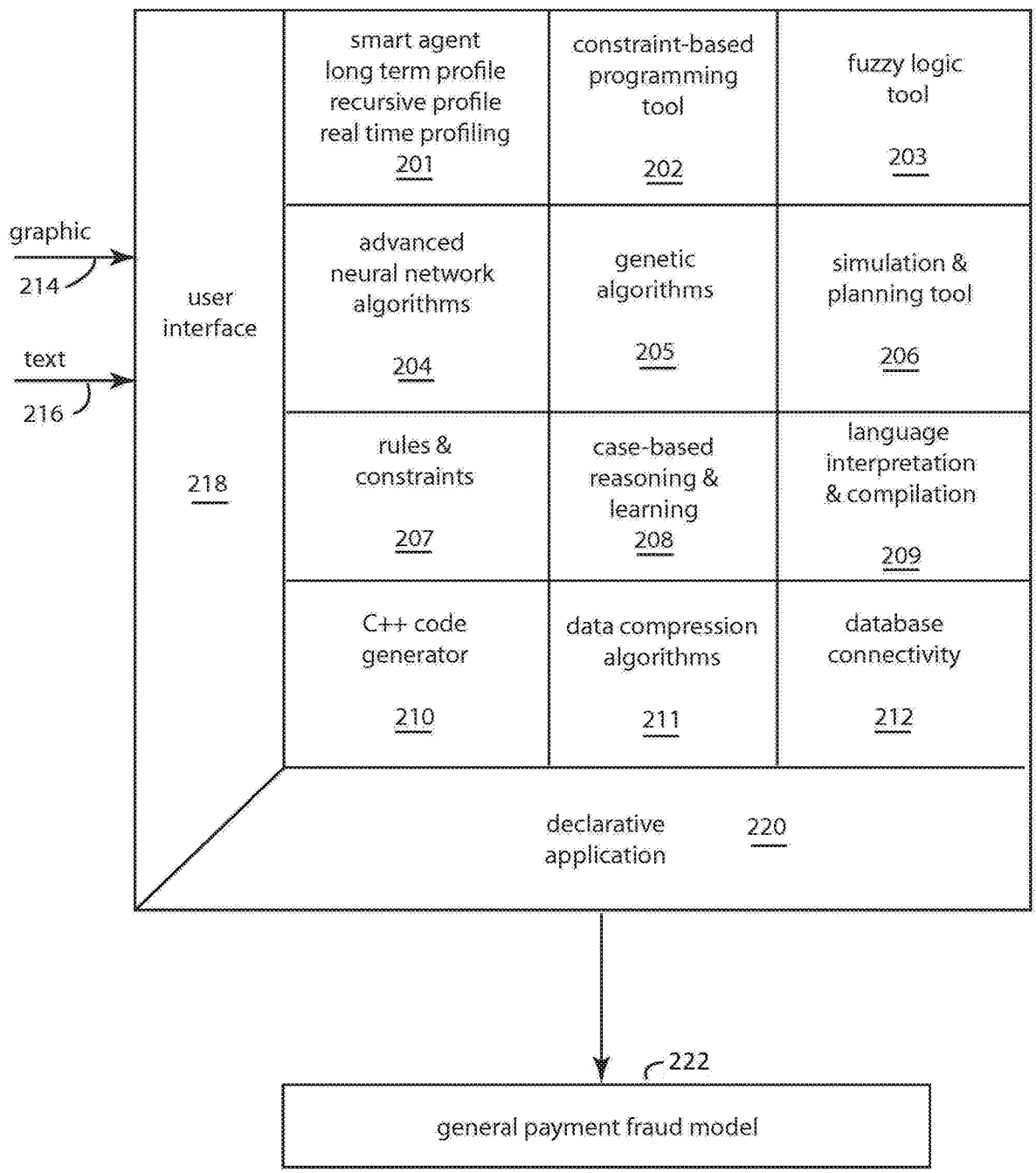
FIG. 2A is functional block diagram of an application development system (ADS) embodiment of the present invention for fraud-based target applications.

Smart agent embodiments of the present invention recognize that the actors and entities behind payment transactions can be fully understood in their essential aspects by way of the attributes reported in each transaction. Nothing else is of much importance, and very little more is usually unavailable anyway.

A legitimate cardholder and any fraudster are in actuality two different people and will behave in two different ways. They each conduct transactions that can be distinguished. Fraudsters have far different agendas and purposes in their transactions than do legitimate cardholders, and so that can cast spotlights. But sometimes legitimate cardholders innocently generate transactions that look like a fraudster was responsible, and sometimes fraudsters succeed at being a wolf-in-sheep's-clothing. Getting that wrong will produce false positives and false negatives in an otherwise well performing fraud management payment system.

In the vast majority of cases, the legitimate cardholders will be completely unknown and anonymous to the fraudster and bits of knowledge about social security numbers, CVV numbers, phone numbers, zipcodes, and passwords will be impossible or expensive to obtain. And so they will be effective as a security factor that will stop fraud. But fraudsters that are socially close to the legitimate cardholder can have those bits within easy reach.

Occasionally each legitimate cardholder will step way out-of-character and generate a transaction that looks suspicious or downright fraudulent. Often such transactions can be forecast by previous such outbursts that they or their peers engaged in.

Embodiments of the present invention generate a population of virtual smart agents corresponding to every cardholder, merchant, and device ID that was hinted at during modeling and training. Each smart agent contains a profile built line-by-line from corresponding relevant transactions. Actors and entities are built using the attributes expressed in each transaction.

The collecting, storing, and accessing of the transactional attributes of millions of smart agents engaging in billions of transactions is a challenge for conventional hardware platforms. Our earlier filed United States patent applications provide practical details on how a working system platform to host our smart agents can be built and programmed. For example, U.S. patent application Ser. No. 14/521,386, filed 22-Oct. 2014, and titled, Reducing False Positives with Transaction Behavior Forecasting; and also Ser. No. 14/520,361, filed 22 Oct. 2014, and titled Fast Access Vectors In Real-Time Behavioral Profiling.

At the most elementary level, each smart agent begins as a list of transactions for the corresponding actor or entity that were sorted from the general inflow of transactions. Each list becomes a profile and various velocity counts are pre-computed to make later real-time access more efficient and less burdensome. For example, a running total of the transactions is maintained as an attribute datapoint, as are the minimums, maximums, and averages of the dollar amounts of all long term or short term transactions. The frequency of those transactions per atomic time interval is also preprocessed and instantly available in any time interval. The frequencies of zipcodes involved in transactions is another velocity count. The radius of those zipcodes around the cardholders home zipcode can be another velocity count from a pre-computation.

So, each smart agent is a multi-dimensional representation of the profiles expressing various information using attributes and velocity counts in its width and time intervals and constituent transactions in its length. As time moves to the next interval, the time intervals in every smart agent are effectively shift registered and pushed down.

The smart agent profiles can be data mined for purchasing patterns, e.g., airline ticket purchases are always associated with car rentals and hotel charges. Concert ticket venues are associated with high end restaurants and bar bills. These patterns can form behavioral clusters useful in forecasting.

FIG. 1 represents an artificial intelligence fraud management solution embodiment of the present invention, and is referred to herein by the general reference numeral 100. Such solution 100 comprises an expert programmer development system 102 for building trainable general payment fraud models 104 that integrate several, but otherwise blank artificial intelligence classifiers, e.g., neural networks, case based reasoning, decision trees, genetic algorithms, fuzzy logic, and rules and constraints. These are further integrated by the expert programmers inputs 106 and development system 102 to include smart agents and associated real-time profiling, recursive profiles, and long-term profiles.

The trainable general payment fraud models 104 are trained with supervised and unsupervised data 108 and 110 to produce a trained payment fraud model 112. For example, accountholder and historical transaction data. This trained payment fraud model 112 can then be sold as a computer program library or a software-as-a-service applied payment fraud model. This then is applied by a commercial client in an applied payment fraud model 114 to process real-time transactions and authorization requests 116 for fraud scores. The applied payment fraud model 114 is further able to accept a client tuning input 120.

FIG. 2A represents an application development system (ADS) embodiment of the present invention for fraud-based target applications, and is referred to herein by the general reference numeral 200. Such is the equivalent of development system 102 in FIG. 1. ADS 200 comprises a number of computer program development libraries and tools that highly skilled artificial intelligence scientists and artisans can manipulate into a novel combination of complementary technologies. In an early embodiment of ADS 200 we combined a goal-oriented multi-agent technology 201 for building run-time smart agents, a constraint-based programming tool 202, a fuzzy logic tool 203, a library of genetic algorithms 205, a simulation and planning tool 206, a library of business rules and constraints 207, case-based reasoning and learning tools 208, a real-time interpreted language compiler 209, a C++ code generator 210, a library of data compression algorithms 211, and a database connectivity tool 212. (The last three of which were discontinued in later embodiments of the present invention.)

The highly skilled artificial intelligence scientists and artisans provide graphical and textual inputs 214 and 216 to a user interface (UI) 218 to manipulate the novel combinations of complementary technologies into a declarative application 220.

Declarative application 220 is molded, modeled, simulated, tested, corrected, massaged, and unified into a fully functional hybrid combination that is eventually output as a trainable general payment fraud model 222. Such is the equivalent of trainable general payment fraud model 104 in FIG. 1.

It was discovered by the present inventor that the highly skilled artificial intelligence scientists and artisans that could manipulate the complementary technologies mentioned into specific novel combinations required exceedingly talented individuals that were in short supply.

It was, however, possible to build and to prove out that ADS 200 as a compiler would produce trainable general payment fraud models 222, and these were more commercially attractive and viable.

After many years of experimental use and trials, ADS 200 was constantly improved and updated. Database connectivity tool 212, for example, tried to press conventional databases into service during run-time to receive and supply datapoints in real-time transaction service. It turned out no conventional databases were up to it. The constraint-based programming tools 202 and 232, C++ code generator, and interpreter languages were also dropped and not used in current embodiments.

Figure 2B:
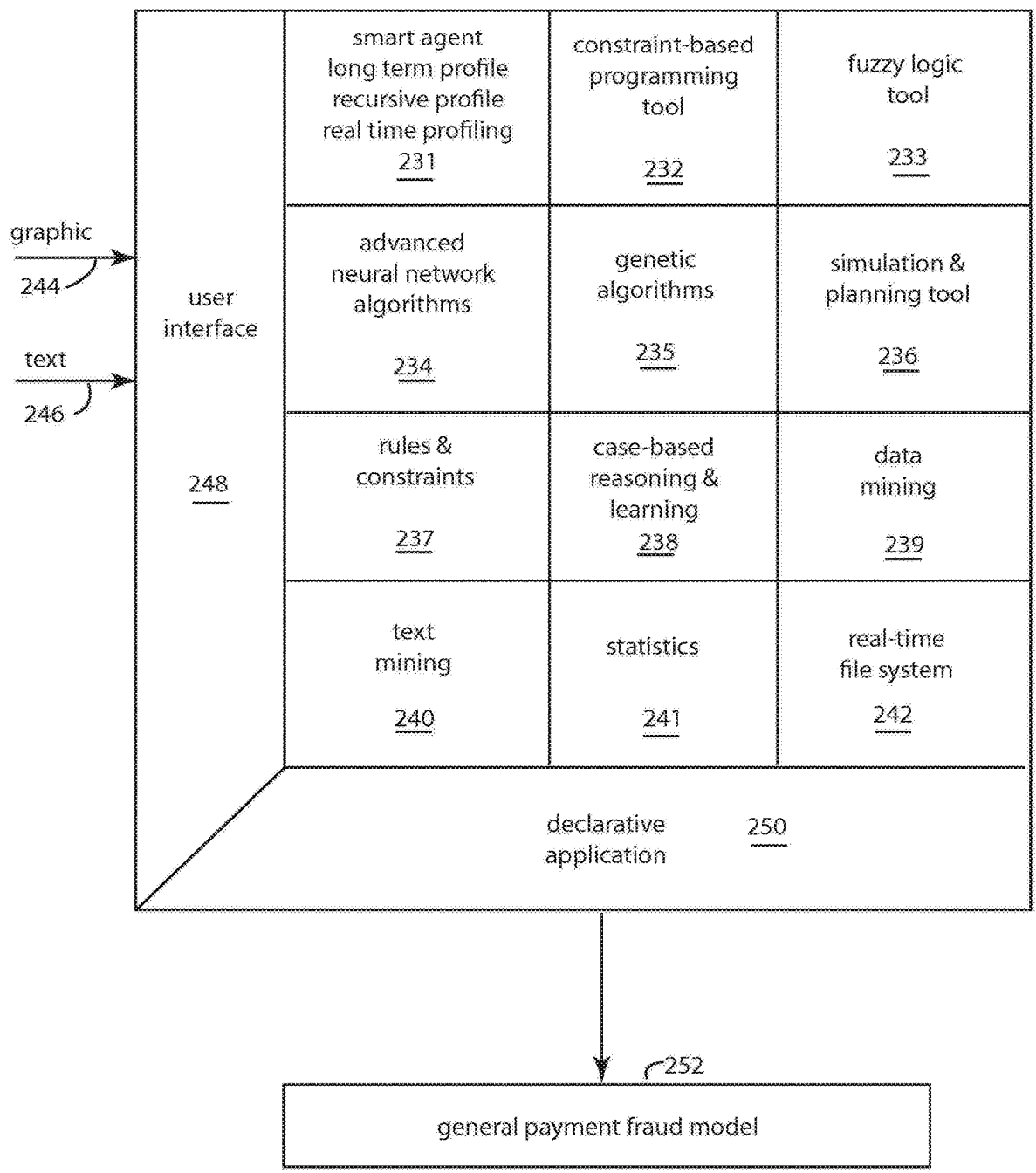
FIG. 2B is functional block diagram of an improved and updated application development system (ADS) embodiment of the present invention for fraud-based target applications.

At the present, an updated and improved ADS shown with general reference numeral 230 in FIG. 2B is providing better and more useful trainable general payment fraud models.

ADS 230 is the most recent equivalent of development system 102 in FIG. 1. ADS 230 assembles together a different mix of computer program development libraries and tools for the highly skilled artificial intelligence scientists and artisans to manipulate into a new hybrid of still complementary technologies.

In this later embodiment, ADS 230, we combined an improved smart-agent technology 231 for building run-time smart agents that are essentially silhouettes of their constituent attributes. These attributes are themselves smart-agents with second level attributes and values that are able to "call" on real-time profilers, recursive profilers, and long term profilers. Such profilers can provide comparative assessments of each datapoint with the new information flowing in during run-time. In general, "real-time" profiles include transactions less than ninety days old. Long-term profiles accumulate transactions over ninety days old. In some applications, the line of demarcation was forty-five days, due to data storage concerns. Recursive profiles are those that inspect what an entity's peers have done in comparison.

The three profilers can thereafter throw exceptions in each datapoint category, and the number and quality of exceptions thrown across the breadth of the attributes then incoming will produce a fraud risk score that generally rises exponentially with that number of exceptions thrown.

At the top level of a hierarchy of smart agents linked by their attributes are the smart agents for the independent actors who can engage in fraud. In a payment fraud model, that top level will be the cardholders as tracked by the cardholder account numbers reported in transaction data.

These top level smart agents can call on a moving 15-minute window file that has all the transactions reported to the system in the last 15-minutes. Too much activity in 15-minutes by any one actor is cause for further inspection and analysis.

ADS 230 further comprises a constraint-based programming tool 232, a fuzzy logic tool 233, a library of advanced neural network algorithms 234, a library of genetic algorithms 235, a simulation and planning tool 236, a library of business rules and constraints 237, case-based reasoning and learning tools 238, a data mining tool 239, a text mining tool 240, a statistical tool 241 and a real-time file system 242.

The real-time file system 242 is a simple organization of attribute values for smart agent profilers that allow quick, direct file access.

The highly skilled artificial intelligence scientists and artisans provide graphical and textual inputs 244 and 246 to a user interface (UI) 248 to manipulate the novel combinations of complementary technologies into a declarative application 250.

Declarative application 250 is also molded, modeled, simulated, tested, corrected, massaged, and unified into a fully functional hybrid combination that is eventually output as a trainable general payment fraud model 252. Such is also the more improved equivalent of trainable general payment fraud model 104 in FIG. 1.

The constraint-based programming tools 202 and 232 limit the number of possible solutions. Complex conditions with complex constraints can create an exponential number of possibilities. Fixed constraints, fuzzy constraints, and polynomials are combined in cases where no exact solution exists. New constraints can be added or deleted at any time. The dynamic nature of the tool makes possible real-time simulations of complex plans, schedules, and diagnostics.

The constraint-based programming tools are written as a very complete language in its own right. It can integrate a variety of variables and constraints, as in the following Table.

---

Variables: Real, with integer values, enumerated, sets, matrices and vectors, intervals, fuzzy subsets, and more.
Arithmetic Constraints: =, +, -, *, /, /=, >, <, >=, <=, interval addition, interval subtraction, interval multiplication and interval division, max, min, intersection, union, exponential, modulo, logarithm, and more.
Temporal (Allen) Constraints: Control allows you to write any temporal constraints including Equal, N-equal, Before, After, Meets, Overlaps, Starts, Finishes, and personal temporal operators such as Disjoint, Started-by, Overlapped-by, Met-by, Finished-by, and more.

-continued

> Boolean Constraints: Or, And, Not, XOR, Implication,
> Equivalence
> Symbolic Constraints: Inclusion, Union, Intersection,
> Cardinality, Belonging, and more.

Originally, the constraint-based programming tools 202 and 232 included a library of ways to arrange subsystems, constraints and variables.

Fuzzy logic tools 203 and 233 recognize many of the largest problems in organizations cannot be solved by simple yes/no or black/white answers. Sometimes the answers need to be rendered in shades of gray. This is where fuzzy logic proves useful. Fuzzy logic handles imprecision or uncertainty by attaching various measures of credibility to propositions. Such technology enables clear definitions of problems where only imperfect or partial knowledge exists, such as when a goal is approximate, or between all and nothing. In fraud applications, this can equate to the answer being "maybe" fraud is present, and the circumstances warrant further investigation.

Tools 204 and 234 provides different neural network algorithms. Neural networks are algorithmic systems that interpret historical data to identify trends and patterns against which to compare subject cases. The libraries of advanced neural network algorithms can be used to translate databases to neurons without user intervention, and can significantly accelerate the speed of convergence over conventional back propagation, and other neural network algorithms. The present invention's neural net is incremental and adaptive, allowing the size of the output classes to change dynamically.

Neural networks can detect trends and patterns other computer techniques are unable to. Neurons work collaboratively to solve the defined problem. Neural networks are adept in areas that resemble human reasoning, making them well suited to solve problems that involve pattern recognition and forecasting. Thus, neural networks can solve problems that are too complex to solve with conventional technologies.

Libraries 205 and 235 include genetic algorithms to initialize a population of elements where each element represents one possible set of initial attributes. Once the models are designed based on these elements, a blind test performance is used as the evaluation function. The genetic algorithm will be then used to select the attributes that will be used in the design of the final models. The component particularly helps when multiple outcomes may achieve the same predefined goal. For instance, if a problem can be solved profitably in any number of ways, genetic algorithms can determine the most profitable way.

Simulation and planning tool 206 can be used during model designs to check the performances of the models.

Business rules and constraints 207 provides a central storage of best practices and know how that can be applied to current situations. Rules and constraints can continue to be captured over the course of years, applying them to the resolution of current problems.

Case-based reasoning 208 uses past experiences in solving similar problems to solve new problems. Each case is a history outlined by its descriptors and the steps that lead to a particular outcome. Previous cases and outcomes are stored and organized in a database. When a similar situation presents itself again later, a number of solutions that can be tried, or should be avoided, will present immediately. Solutions to complex problems can avoid delays in calculations and processing, and be offered very quickly.

During run-time, real time transaction data 234 can be received and processed according to declarative application 220 by target host 232 with the objective of producing run-time fraud detections 236. For example, in a payments application card payments transaction requests from merchants can be analyzed for fraud activity. In healthcare applications the reports and compensation demands of providers can be scanned for fraud. And in insider trader applications individual traders can be scrutinized for special knowledge that could have illegally helped them profit from stock market moves.

Figure 3:
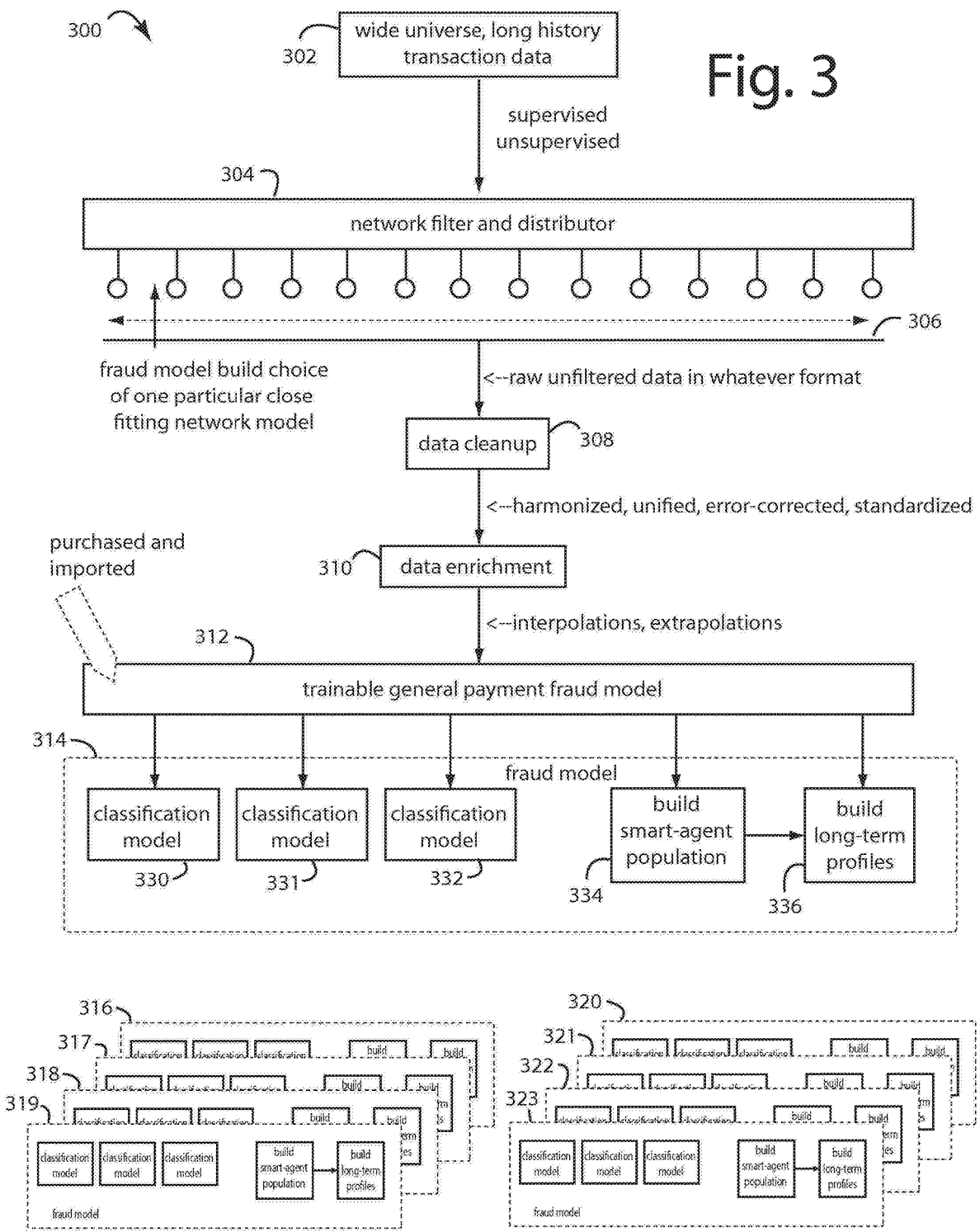
FIG. 3 is functional block diagram of a model training embodiment of the present invention.

FIG. 3 represents a model training embodiment of the present invention, and is referred to herein by the general reference numeral 300. Model trainer 300 can be fed a very complete, comprehensive transaction history 302 that can include both supervised and unsupervised data. A filter 304 actually comprises many individual filters that can be selected by a switch 306. Each filter can separate the supervised and unsupervised data from comprehensive transaction history 302 into a stream correlated by some factor in each transaction.

The resulting filtered training data will produce a trained model that will be highly specific and sensitive to fraud in the filtered category. When two or more of these specialized trained models used in parallel are combined in other embodiments of the present invention they will excel in real-time cross-channel fraud prevention.

In a payment card fraud embodiment of the present invention, during model training, the filters 304 are selected by switch 306 to filter through dozens of different channels, one-at-a-time for each real-time, risk-scoring channel model that will be needed and later run together in parallel. For example, such channels can include channel transactions and authorization requests for card-not-present, card-present, high risk merchant category code (MCC), micro-merchant, small and medium sized enterprise (SME) finance, international, domestic, debit card, credit card, contactless, or other groupings or financial networks.

The objective here is to detect a first hint of fraud in any channel for a particular accountholder, and to "warn" all the other real-time, risk-scoring channel models that something suspicious is occurring with this accountholder. In one embodiment, the warning comprises an update in the nature of feedback to the real-time, long-term, and recursive profiles for that accountholder so that all the real-time, risk-scoring channel models step up together increment the risk thresholds that accountholder will be permitted. More hits in more channels should translate to an immediate alert and shutdown of all the affected accountholders accounts.

Competitive prior art products make themselves immediately unattractive and difficult to use by insisting that training data suit some particular format. In reality, training data will come from multiple, disparate, dissimilar, incongruent, proprietary data sources simultaneously. A data cleanup process 308 is therefore important to include here to do coherence analysis, and to harmonize, unify, error-correct, and otherwise standardize the heterogeneous data coming from transaction data history 302. The commercial advantage of that is a wide range of clients with many different channels can provide their transaction data histories 302 in whatever formats and file structures are natural to the provider. It is expected that embodiments of the present invention will find applications in financial services, defense and cyber security, health and public service, technology, mobile payments, retail and e-commerce, marketing and social networking, and others.

A data enrichment process 310 computes interpolations and extrapolations of the training data, and expands it out to as many as two-hundred and fifty datapoints from the forty or so relevant datapoints originally provided by transaction data history 302.

A trainable fraud model 312 (like that illustrated in FIG. 1 as trainable general payment fraud model 104) is trained into a channel specialized fraud model 314, and each are the equivalent of the applied fraud model 114 illustrated in FIG. 1. The selected training results from the switch 306 setting and the filters 304 then existing.

Channel specialized fraud models 314 can be sold individually or in assorted varieties to clients, and then imported by them as a commercial software app, product, or library.

A variety of selected applied fraud models 316-323 represent the applied fraud models 114 that result with different settings of filter switch 306. Each selected applied fraud model 314 will include a hybrid of artificial intelligence classification models represented by models 330-332 and a smart-agent population build 334 with a corresponding set of real-time, recursive, and long-term profilers 336. The enriched data from data enrichment process 310 is fully represented in the smart-agent population build 334 and profilers 336.

Figure 4:
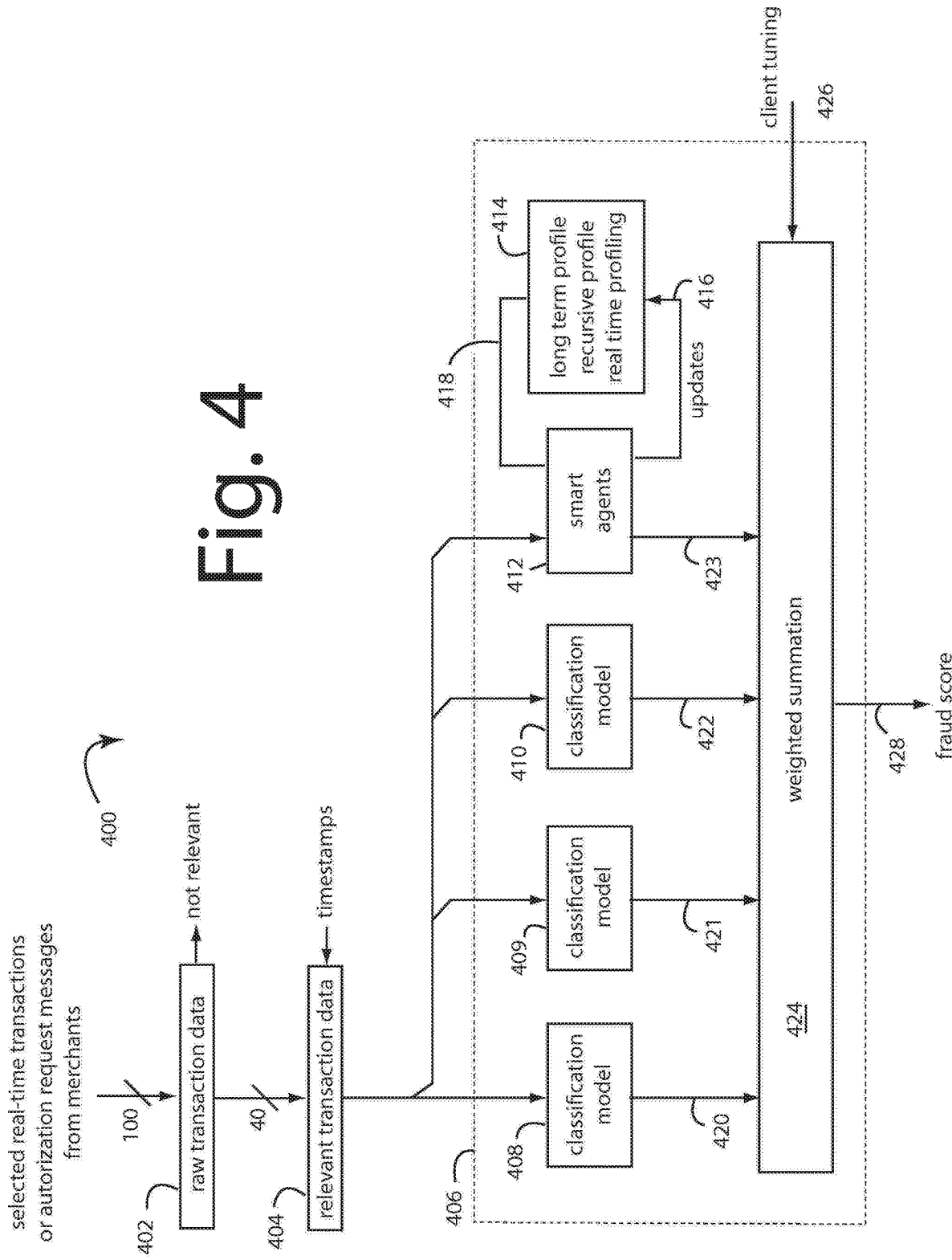
FIG. 4 is functional block diagram of a real-time payment fraud management system like that illustrated in FIG. 1 as applied payment fraud model.

FIG. 4 represents a real-time payment fraud management system 400 like that illustrated in FIG. 1 as applied payment fraud model 114. A raw transaction separator 402 filters through the forty or so data items that are relevant to the computing of a fraud score. A process 404 adds timestamps to these relevant datapoints and passes them in parallel to a selected applied fraud model 406. This is equivalent to a selected one of applied fraud models 316-323 in FIG. 3 and applied payment fraud model 114 in FIG. 1.

During a session in which the time-stamped relevant transaction data flows in, a set of classification models 408-410 operate independently according to their respective natures. A population of smart agents 412 and profilers 414 also operate on the time-stamped relevant transaction data inflows. Each new line of time-stamped relevant transaction data will trigger an update 416 of the respective profilers 414. Their attributes 418 are provided to the population of smart agents 412.

The classification models 408-410 and population of smart agents 412 and profilers 414 all each produce an independent and separate vote or fraud score 420-423 on the same line of time-stamped relevant transaction data. A weighted summation processor 424 responds to client tunings 426 to output a final fraud score 428.

Figure 5:
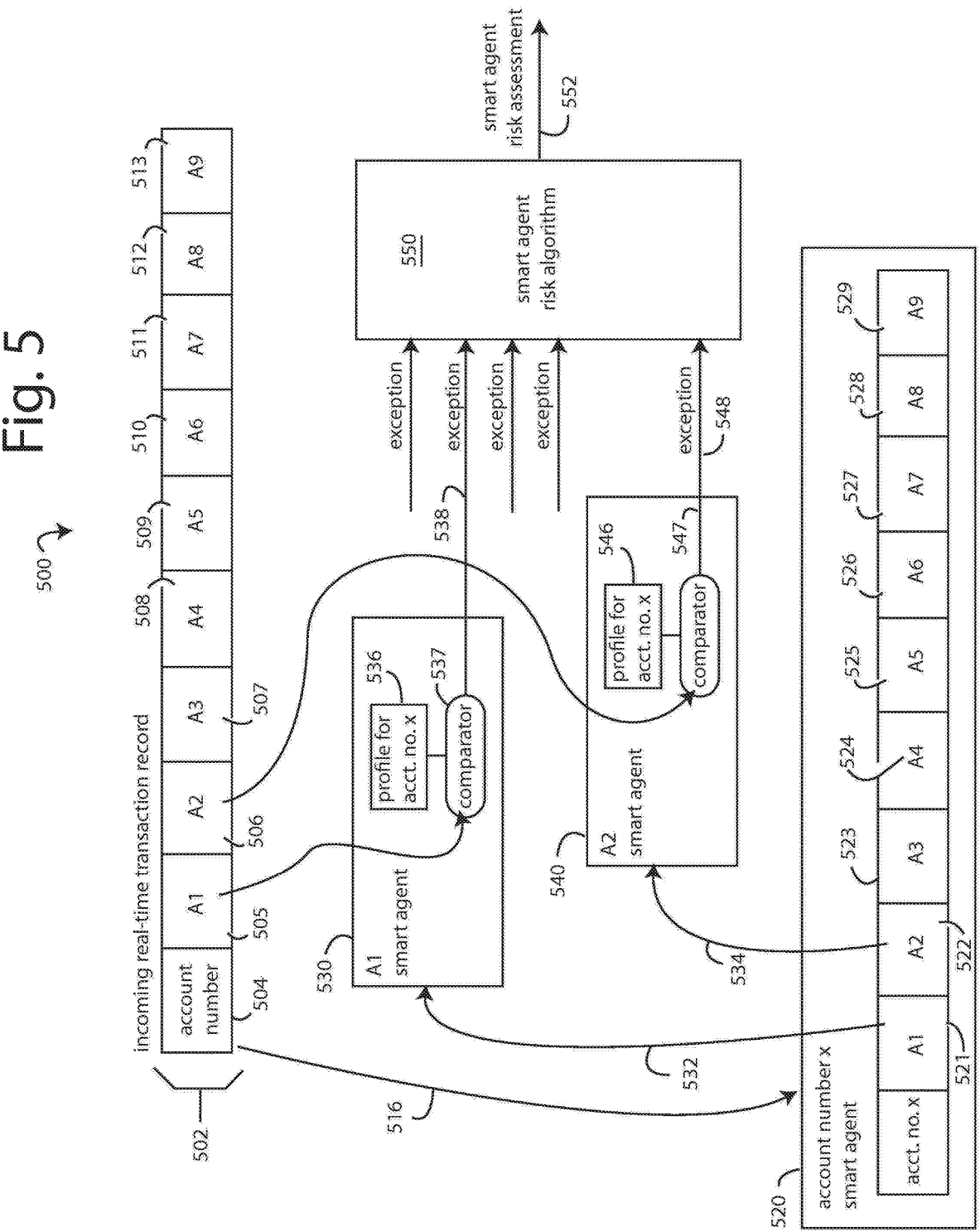
FIG. 5 is functional block diagram of a smart agent process embodiment of the present invention.

FIG. 5 represents a smart agent process 500 in an embodiment of the present invention. For example, these would include the smart agent population build 334 and profiles 336 in FIG. 3 and smart agents 412 and profiles 414 in FIG. 4. A series of payment card transactions arriving in real-time in an authorization request message is represented here by a random instantaneous incoming real-time transaction record 502.

Such record 502 begins with an account number 504. It includes attributes A1-A9 numbered 505-513 here. These attributes, in the context of a payment card fraud application would include datapoints for card type, transaction type, merchant name, merchant category code (MCC), transaction amount, time of transaction, time of processing, etc.

Account number 504 in record 502 will issue a trigger 516 to a corresponding smart agent 520 to present itself for action. Smart agent 520 is simply a constitution of its attributes, again A1-A9 and numbered 521-529 in FIG. 5. These attributes A1-A9 521-529 are merely pointers to attribute smart agents. Two of these, one for A1 and one for A2, are represented in FIG. 5. Here, an A1 smart agent 530 and an A2 smart agent 540. These are respectively called into action by triggers 532 and 542.

A1 smart agent 530 and A2 smart agent 540 will respectively fetch correspondent attributes 505 and 506 from incoming real-time transaction record 502. Smart agents for A3-A9 make similar fetches to themselves in parallel. They are not shown here to reduce the clutter for FIG. 5 that would otherwise result.

Each attribute smart agent like 530 and 540 will include or access a corresponding profile datapoint 536 and 546. This is actually a simplification of the three kinds of profiles 336 (FIG. 3) that were originally built during training and updated in update 416 (FIG. 4). These profiles are used to track what is "normal" behavior for the particular account number for the particular single attribute.

For example, if one of the attributes reports the MCC's of the merchants and another reports the transaction amounts, then if the long-term, recursive, and real time profiles for a particular account number x shows a pattern of purchases at the local Home Depot and Costco that average $100-$300, then an instantaneous incoming real-time transaction record 502 that reports another $200 purchase at the local Costco will raise no alarms. But a sudden, unique, inexplicable purchase for $1250 at a New York Jeweler will and should throw more than one exception.

Each attribute smart agent like 530 and 540 will further include a comparator 537 and 547 that will be able to compare the corresponding attribute in the instantaneous incoming real-time transaction record 502 for account number x with the same attributes held by the profiles for the same account. Comparators 537 and 547 should accept some slack, but not too much. Each can throw an exception 538 and 548, as can the comparators in all the other attribute smart agents. It may be useful for the exceptions to be a fuzzy value, e.g., an analog signal 0.0 to 1.0. Or it could be a simple binary one or zero. What sort of excursions should trigger an exception is preferably adjustable, for example with client tunings 426 in FIG. 4.

These exceptions are collected by a smart agent risk algorithm 550. One deviation or exception thrown on any one attribute being "abnormal" can be tolerated if not too egregious. But two or more should be weighted more than just the simple sum, e.g., $(1+1)''=2''$ instead of simply $1+1=2$. The product is output as a smart agent risk assessment 552. This output is the equivalent of independent and separate vote or fraud score 423 in FIG. 4.

Figure 6:
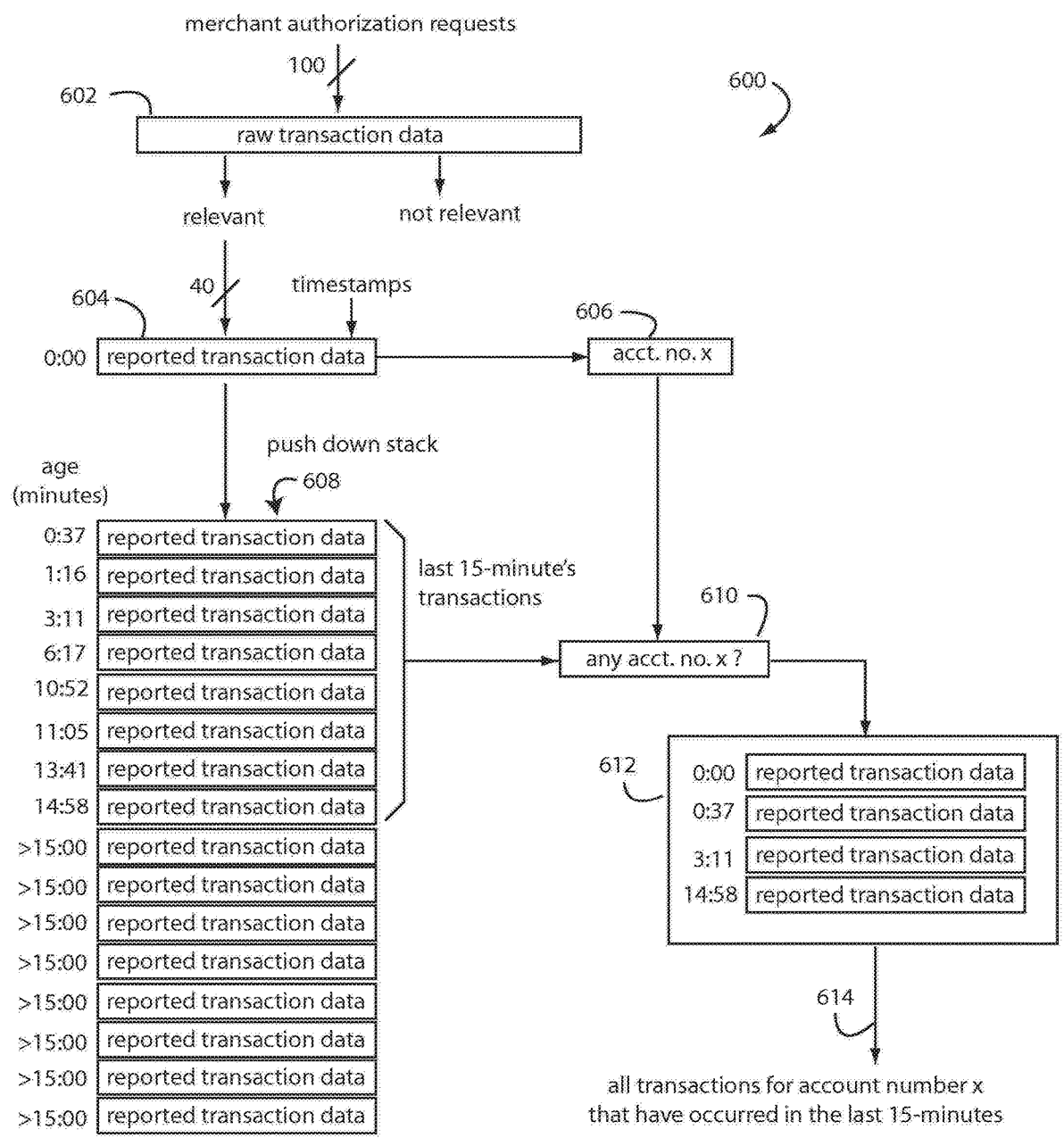
FIG. 6 is functional block diagram of a most recent fifteen-minute transaction velocity counter.

FIG. 6 represents a most recent 15-minute transaction velocity counter 600, in an embodiment of the present invention. It receives the same kind of real-time transaction data inputs as were described in connection with FIG. 4 as raw transaction data 402 and FIG. 5 as records 502. A raw transaction record 602 includes a hundred or so datapoints. About forty of those datapoints are relevant to fraud detection an identified in FIG. 6 as reported transaction data 604.

The reported transaction data 604 arrive in a time series and randomly involve a variety of active account numbers. But, let's say the most current reported transaction data 604 with a time age of 0:00 concerns a particular account number x. That fills a register 606.

Earlier arriving reported transaction data 604 build a transaction time-series stack 608. FIG. 6 arbitrarily identifies the respective ages of members of transaction time-series stack 608 with example ages 0:73, 1:16, 3:11, 6:17, 10:52, 11:05, 13:41, and 14:58. Those aged more than 15-minutes are simply identified with ages ">15:00". This embodiment of the present invention is concerned with only the last 15-minutes worth of transactions. As time passes transaction time-series stack 608 pushes down.

The key concern is whether account number x has been involved in any other transactions in the last 15-minutes. A search process 610 accepts a search key from register 606 and reports any matches in the most 15-minute window with an account activity velocity counter 612. Too much very recent activity can hint there is a fraudster at work, or it may be normal behavior. A trigger 614 is issued that can be fed to an additional attribute smart agent that is included with attributes smart agents 530 and 540 and the others in parallel. Exception from this new account activity velocity counter smart agent is input to smart agent risk algorithm 550 in FIG. 5.

Figure 7:
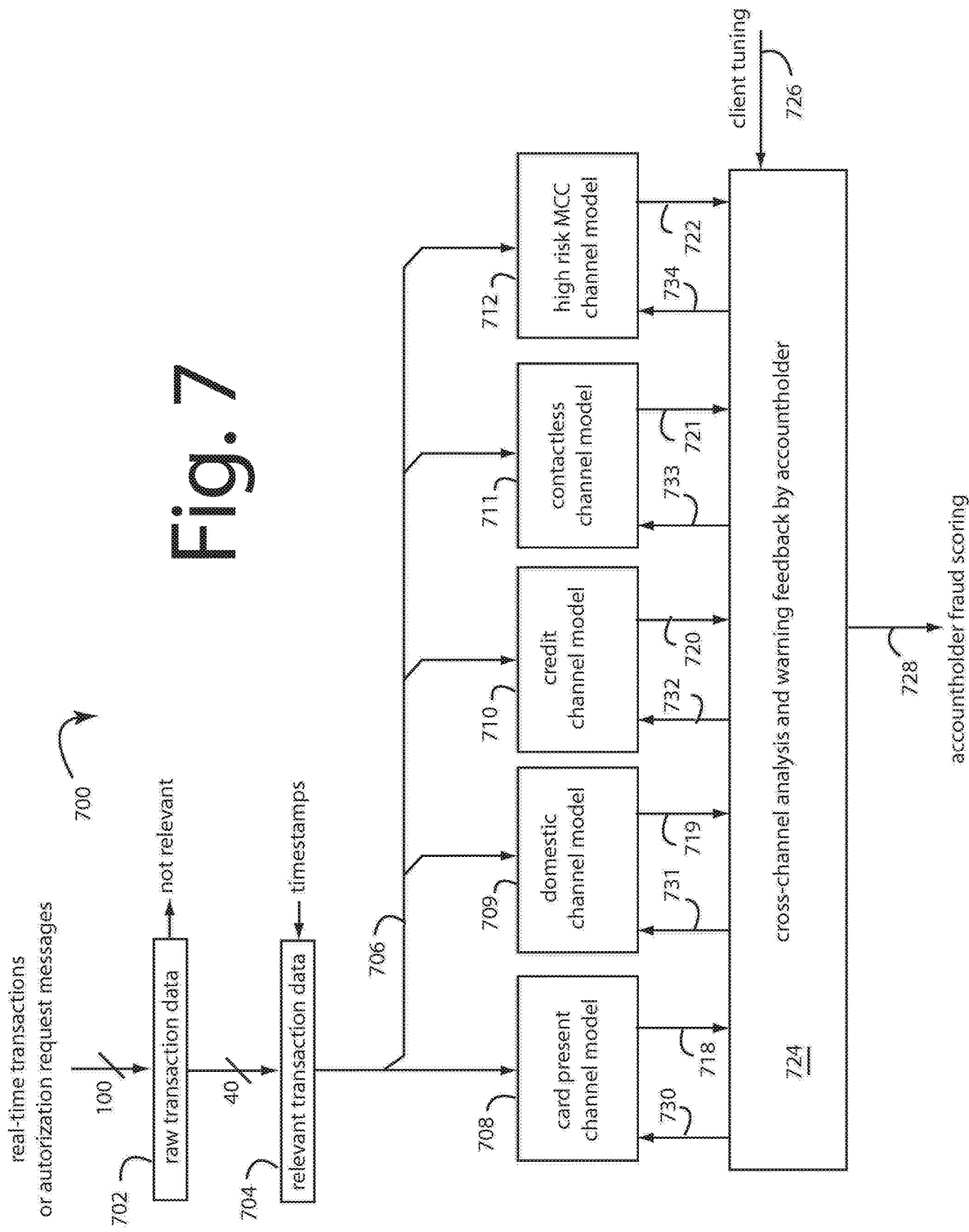
FIG. 7 is functional block diagram of a cross-channel payment fraud management embodiment of the present invention.

FIG. 7 represents a cross-channel payment fraud management embodiment of the present invention, and is referred to herein by general reference numeral 700.

Real-time cross-channel monitoring uses track cross channel and cross product patterns to cross pollinate information for more accurate decisions. Such track not only the channel where the fraud ends but also the initiating channel to deliver a holistic fraud monitoring. A standalone internet banking fraud solution will allow a transaction if it is within its limits, however if core banking is in picture, then it will stop this transaction, as we additionally know the source of funding of this account (which mostly in missing in internet banking).

In FIG. 3, a variety of selected applied fraud models 316-323 represent the applied fraud models 114 that result with different settings of filter switch 306. A real-time cross-channel monitoring payment network server can be constructed by running several of these selected applied fraud models 316-323 in parallel.

FIG. 7 represents a real-time cross-channel monitoring payment network server 700, in an embodiment of the present invention. Each customer or accountholder of a financial institution can have several very different kinds of accounts and use them in very different transactional channels. For example, card-present, domestic, credit card, contactless. So in order for a cross-channel fraud detection system to work at its best, all the transaction data from all the channels is funneled into one pipe for analysis.

Real-time transactions and authorization requests data is input and stripped of irrelevant datapoints by a process 702. The resulting relevant data is time-stamped in a process 704. The 15-minute vector process of FIG. 6 may be engaged at this point in background. A bus 706 feeds the data in parallel line-by-line, e.g., to a selected applied fraud channel model for card present 708, domestic 709, credit 710, contactless 711, and high risk MCC 712. Each can pop an exception to the current line input data with an evaluation flag or score 718-722. The involved accountholder is understood.

These exceptions are collected and analyzed by a process 724 that can issue warning feedback for the profiles maintained for each accountholder. Each selected applied fraud channel model 708-712 shares risk information about particular accountholders with the other selected applied fraud models 708-712. A suspicious or outright fraudulent transaction detected by a first selected applied fraud channel model 708-712 for a particular customer in one channel is cause for a risk adjustment for that same customer in all the other applied fraud models for the other channels.

Exceptions 718-722 to an instant transactions on bus 706 trigger an automated examination of the customer or accountholder involved in a profiling process 724, especially with respect to the 15-minute vectors and activity in the other channels for the instant accountholder. A client tuning input 726 will affect an ultimate accountholder fraud scoring output 728, e.g., by changing the respective risk thresholds for genuine-suspicious-fraudulent.

A corresponding set of warning triggers 730-734 is fed back to all the applied fraud channel models 708-712. The compromised accountholder result 728 can be expected to be a highly accurate and early protection warning.

In general, a process for cross-channel financial fraud protection comprises training a variety of real-time, risk-scoring fraud models with training data selected for each from a common transaction history to specialize each member in the monitoring of a selected channel. Then arranging the variety of real-time, risk-scoring fraud models after the training into a parallel arrangement so that all receive a mixed channel flow of real-time transaction data or authorization requests. The parallel arrangement of diversity trained real-time, risk-scoring fraud models is hosted on a network server platform for real-time risk scoring of the mixed channel flow of real-time transaction data or authorization requests. Risk thresholds are immediately updated for particular accountholders in every member of the parallel arrangement of diversity trained real-time, risk-scoring fraud models when any one of them detects a suspicious or outright fraudulent transaction data or authorization request for the accountholder. So, a compromise, takeover, or suspicious activity of the accountholder's account in any one channel is thereafter prevented from being employed to perpetrate a fraud in any of the other channels.

Such process for cross-channel financial fraud protection can further comprise steps for building a population of real-time and a long-term and a recursive profile for each the accountholder in each the real-time, risk-scoring fraud models. Then during real-time use, maintaining and updating the real-time, long-term, and recursive profiles for each accountholder in each and all of the real-time, risk-scoring fraud models with newly arriving data. If during real-time use a compromise, takeover, or suspicious activity of the accountholder's account in any one channel is detected, then updating the real-time, long-term, and recursive profiles for each accountholder in each and all of the other real-time, risk-scoring fraud models to further include an elevated risk flag. The elevated risk flags are included in a final risk score calculation 728 for the current transaction or authorization request.

The 15-minute vectors described in FIG. 6 are a way to cross pollenate risks calculated in one channel with the others. The 15-minute vectors can represent an amalgamation of transactions in all channels, or channel-by channel. Once a 15-minute vector has aged, it can be shifted into a 30-minute vector, a one-hour vector, and a whole day vector by a simple shift register means. These vectors represent velocity counts that can be very effective in catching fraud as it is occurring in real time.

In every case, embodiments of the present invention include adaptive learning that combines three learning techniques to evolve the artificial intelligence classifiers, e.g., 408-414. First is the automatic creation of profiles, or smart-agents, from historical data, e.g., long-term profiling. See FIG. 3. The second is real-time learning, e.g., enrichment of the smart-agents based on real-time activities. See FIG. 4. The third is adaptive learning carried by incremental learning algorithms. See FIG. 7.

For example, two years of historical credit card transactions data needed over twenty seven terabytes of database storage. A smart-agent is created for each individual card in that data in a first learning step, e.g., long-term profiling. Each profile is created from the card's activities and transactions that took place over the two year period. Each profile for each smart-agent comprises knowledge extracted field-by-field, such as merchant category code (MCC), time, amount for an mcc over a period of time, recursive profiling, zip codes, type of merchant, monthly aggregation, activity during the week, weekend, holidays, Card not present (CNP) versus card present (CP), domestic versus cross-border, etc. this profile will highlights all the normal activities of the smart-agent (specific card).

Smart-agent technology has been observed to outperform conventional artificial and machine learning technologies. For example, data mining technology creates a decision tree from historical data. When historical data is applied to data mining algorithms, the result is a decision tree. Decision tree logic can be used to detect fraud in credit card transactions. But, there are limits to data mining technology. The first is data mining can only learn from historical data and it generates decision tree logic that applies to all the cardholders as a group. The same logic is applied to all cardholders even though each merchant may have a unique activity pattern and each cardholder may have a unique spending pattern.

A second limitation is decision trees become immediately outdated. Fraud schemes continue to evolve, but the decision tree was fixed with examples that do not contain new fraud schemes. So stagnant non-adapting decision trees will fail to detect new types of fraud, and do not have the ability to respond to the highly volatile nature of fraud.

Another technology widely used is "business rules" which requires actual business experts to write the rules, e.g., if-then-else logic. The most important limitations here are that the business rules require writing rules that are supposed to work for whole categories of customers. This requires the population to be sliced into many categories (students, seniors, zip codes, etc.) and asks the experts to provide rules that apply to all the cardholders of a category.

How could the US population be sliced? Even worse, why would all the cardholders in a category all have the same behavior? It is plain that business rules logic has built-in limits, and poor detection rates with high false positives. What should also be obvious is the rules are outdated as soon as they are written because conventionally they don't adapt at all to new fraud schemes or data shifts.

Neural network technology also limits, it uses historical data to create a matrix weights for future data classification. The Neural network will use as input (first layer) the historical transactions and the classification for fraud or not as an output). Neural Networks only learn from past transactions and cannot detect any new fraud schemes (that arise daily) if the neural network was not re-trained with this type of fraud. Same as data mining and business rules the classification logic learned from the historical data will be applied to all the cardholders even though each merchant has a unique activity pattern and each cardholder has a unique spending pattern.

Another limit is the classification logic learned from historical data is outdated the same day of its use because the fraud schemes changes but since the neural network did not learn with examples that contain this new type of fraud schemes, it will fail to detect this new type of fraud it lacks the ability to adapt to new fraud schemes and do not have the ability to respond to the highly volatile nature of fraud.

Contrary to previous technologies, smart-agent technology learns the specific behaviors of each cardholder and create a smart-agent that follow the behavior of each cardholder. Because it learns from each activity of a cardholder, the smart-agent updates the profiles and makes effective changes at runtime. It is the only technology with an ability to identify and stop, in real-time, previously unknown fraud schemes. It has the highest detection rate and lowest false positives because it separately follows and learns the behaviors of each cardholder.

Smart-agents have a further advantage in data size reduction. Once, say twenty-seven terabytes of historical data is transformed into smart-agents, only 200-gigabytes is needed to represent twenty-seven million distinct smart-agents corresponding to all the distinct cardholders.

Incremental learning technologies are embedded in the machine algorithms and smart-agent technology to continually re-train from any false positives and negatives that occur along the way. Each corrects itself to avoid repeating the same classification errors. Data mining logic incrementally changes the decision trees by creating a new link or updating the existing links and weights. Neural networks update the weight matrix, and case based reasoning logic updates generic cases or creates new ones. Smart-agents update their profiles by adjusting the normal/abnormal thresholds, or by creating exceptions.

In real-time behavioral profiling by the smart-agents, both the real-time and long-term engines require high speed transfers and lots of processor attention. Conventional database systems cannot provide the transfer speeds necessary, and the processing burdens cannot be tolerated.

Embodiments of the present invention include a fast, low overhead, custom file format and storage engine designed to retrieve profiles in real-time with a constant low load and save time. For example, the profiles 336 built in FIG. 3, and long-term, recursive, and real-time profiles 414 in FIG. 4.

Figure 8:
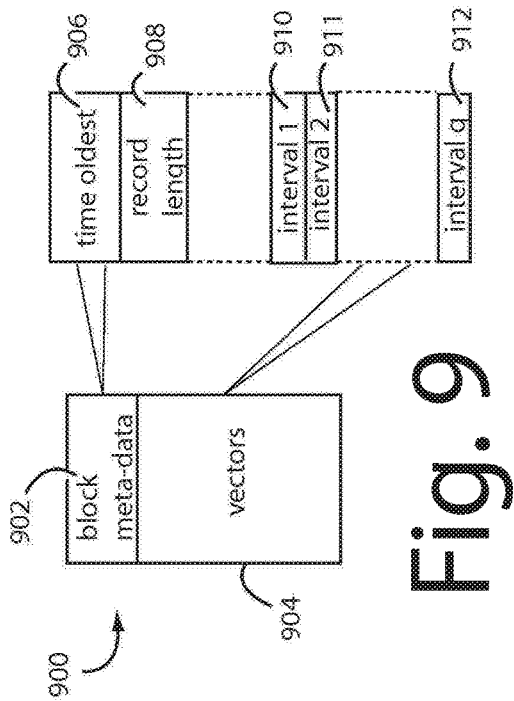
FIG. 8 is a diagram of a group of smart agent profiles stored in a custom binary file.

Referring now to FIG. 8, a group of smart agent profiles is stored in a custom binary file 800 which starts with a meta-data section 802 containing a profile definition, and a number of fixed size profile blocks, e.g., 804, 805, . . . 806 each containing the respective profiles. Such profiles are individually reserved to and used by a corresponding smart agent, e.g., profile 536 and smart agent 530 in FIG. 5. Fast file access to the profiles is needed on the arrival of every transaction 502. In FIG. 5, account number 504 signals the particular smart agents and profiles to access and that are required to provide a smart agent risk assessment 552 in real-time. For example, an approval or a denial in response to an authorization request message.

Figure 9:
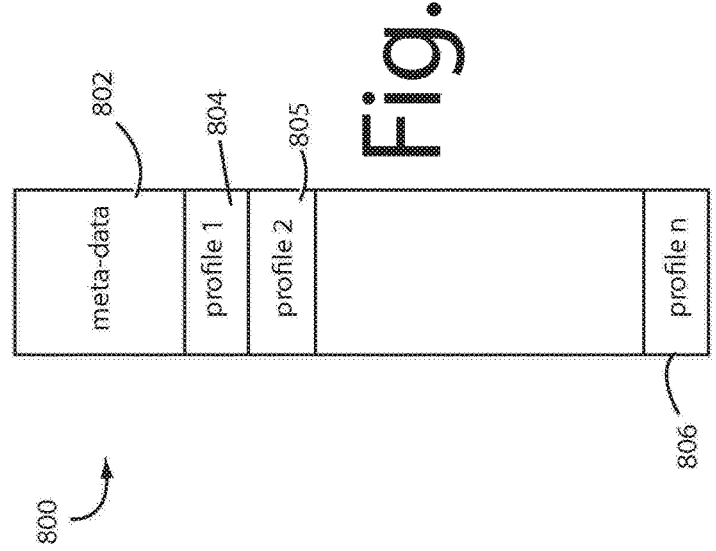
FIG. 9 is a diagram of the file contents of an exemplary smart agent profile.

FIG. 9 represents what's inside each such profile, e.g., a profile 900 includes a meta-data 902 and a rolling list of vectors 904. The meta-data 902 comprises the oldest one's time field 906, and a record length field 908. Transaction events are timestamped, recorded, and indexed by a specified atomic interval, e.g., ten minute intervals are typical, which is six hundred seconds. Each vector points to a run of profile datapoints that all share the same time interval, e.g., intervals 910-912. Some intervals will have no events, and therefor no vectors 904. Here, all the time intervals less than ninety days old are considered by the real-time (RT) profiles. Ones older than that are amalgamated into the respective long-term (LT) profiles.

What was purchased and how long ago a transaction for a particular accountholder occurred, and when their other recent transactions occurred can provide valuable insights into whether the transactions the accountholder is presently engaging in are normal and in character, or deviating. Forcing a fraud management and protection system to hunt a conventional database for every transaction a particular random accountholder engaged in is not practical. The accountholders' transactions must be pre-organized into their respective profiles so they are always randomly available for instant calculations. How that is made possible in embodiments of the present invention is illustrated here in FIGS. 5, 6, and 8-10.

Figure 10:
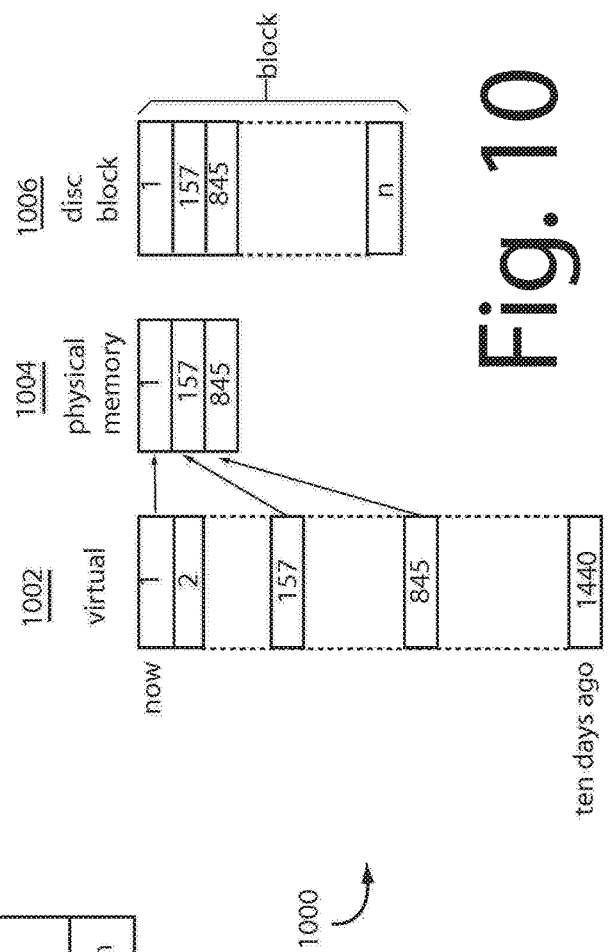
FIG. 10 is a diagram of a virtual addressing scheme used to access transactions in atomic time intervals by their smart agent profile vectors.

FIG. 10 illustrates a virtual memory system 1000 in which a virtual address representation 1002 is translated into a physical memory address 1004, and/or a disk block address 1006.

Profiling herein looks at events that occurred over a specific span of time. Any vectors that were assigned to events older than that are retired and made available for re-assignment to new events as they are added to the beginning of the list.

The following pseudo-code examples represent how smart agents (e.g., 412, 550) lookup profiles and make behavior deviation computations. A first step when a new transaction (e.g., 502) arrives is to find the one profile it should be directed to in the memory or filing system.

```
find_profile ( T: transaction, PT: Profile's Type)
Begin
    Extract the value from T for each key used in the routing
    logic for PT
    Combine the values from each key into PK
    Search for PK in the in-memory index
    If found, load the profile in the file of type PT based on the
    indexed position.
    Else, this is a new element without a profile of type PT yet.
End
```

If the profile is not a new one, then it can be updated, otherwise a new one has to be created.

```
update_profile ( T: transaction, PT: Profile's Type)
Begin
    find_profile of type PT P associated to T
    Deduce the timestamp t associated to T
    If P is empty, then add a new record based on the atomic interval for t
    Else locate the record to update based on t
        If there is no record associated to t yet,
        Then add a new record based on the atomic interval for t
    For each datapoint in the profile, update the record
    with the values in T (by
    increasing a count, sum, deducing a new minimum, maximum ...).
    Save the update to disk
End
compute_profile ( T: transaction, PT: Profile's Type)
Begin
    update_profile P of type PT with T
    Deduce the timestamp t associated to T
    For each datapoint DP in the profile,
        Initialize the counter C
        For each record R in the profile P
            If the timestamp t associated to R belongs to the span of time
            for DP
            Then update C with the value of DP in the record R
                (by increasing a count, sum,
                    deducing a new minimum, maximum ...)
        End For
    End For
    Return the values for each counter C
End
compute_profile ( T: transaction, PT: Profile's Type)
Begin
    update_profile P of type PT with T
    Deduce the timestamp t associated to T
    For each datapoint DP in the profile,
        Initialize the counter C
        For each record R in the profile P
            If the timestamp t associated to R belongs to the span of time
            for DR
```

```
            Then update C with the value of DB in the record R
                (by increasing a count, sum,
                    deducing a new minimum, maximum ...)
        End For
    End For
    Return the values for each counter C
End
```

The entity's behavior in the instant transaction is then analyzed to determine if the real-time (RT) behavior is out of the norm defined in the corresponding long-term (LT) profile. If a threshold (T) is exceeded, the transaction risk score is incremented.

```
analyze_entity_behavior ( T: transaction)
Begin
    Get the real-time profile RT by calling compute_profile( T, real-time)
    Get the long-term profile LT by calling compute_profile( T, long-term)
    Analyze the behavior of the entity by comparing its
    current behavior RT to its past
    behavior LT:
    For each datapoint DP in the profile,
        Compare the current value in RT to the one in
        LT (by computing the ratio or
        distance between the values).
            If the ratio or distance is greater than the pre-defined threshold,
            Then increase the risk associated to the transaction T
            Else decrease the risk associated to the transaction T
    End For
    Return the global risk associated to the transaction T
End
```

The entity's behavior in the instant transaction can further be analyzed to determine if its real-time (RT) behavior is out of the norm compared to its peer groups. defined in the corresponding long-term (LT) profile. If a threshold (T) is exceeded, the transaction risk score is incremented.

Recursive profiling compares the transaction (T) to the entity's peers one at a time.

```
compare_entity_to_peers ( T: transaction)
Begin
    Get the real-time profile RTe by calling compute_profile( T, real-time)
    Get the long-term profile LTe by calling compute_profile( T, long-term)
    Analyze the behavior of the entity by comparing it to its peer groups:
    For each peer group associated to the entity
        Get the real-time profile RTp of the peer: compute_profile
        ( T, real-time)
        Get the long-term profile LTp of the peer: compute_profile
        ( T, long-term)
        For each datapoint DP in the profile,
        Compare the current value in RTe and LTe to the ones in RTp
        and LTp (by
        computing the ratio or distance between the values).
            If the ratio or distance is greater than the pre-defined threshold,
            Then increase the risk associated to the transaction T
            Else decrease the risk associated to the transaction T
        End For
    End For
    Return the global risk associated to the transaction T
End
```

Each attribute inspection will either increase or decrease the associated overall transaction risk. For example, a transaction with a zipcode that is highly represented in the long term profile would reduce risk. A transaction amount in line with prior experiences would also be a reason to reduce risk. But an MCC datapoint that has never been seen before for this entity represents a high risk. (Unless it could be forecast or otherwise predicted.)

One or more datapoints in a transaction can be expanded with a velocity count of how-many or how-much of the corresponding attributes have occurred over at least one different span of time intervals. The velocity counts are included in a calculation of the transaction risk.

Transaction risk is calculated datapoint-by-datapoint and includes velocity count expansions. The datapoint values that exceed a normative point by a threshold value increment the transaction risk. Datapoint values that do not exceed the threshold value cause the transaction risk to be decremented. A positive or negative bias value can be added that effectively shifts the threshold values to sensitize or desensitize a particular datapoint for subsequent transactions related to the same entity. For example, when an airline expense is certain to be followed by a rental car or hotel expense in a far away city. The MCC's for rental car and hotel expenses are desensitized, as are datapoints for merchant locations in a corresponding far away city.

Figure 11:
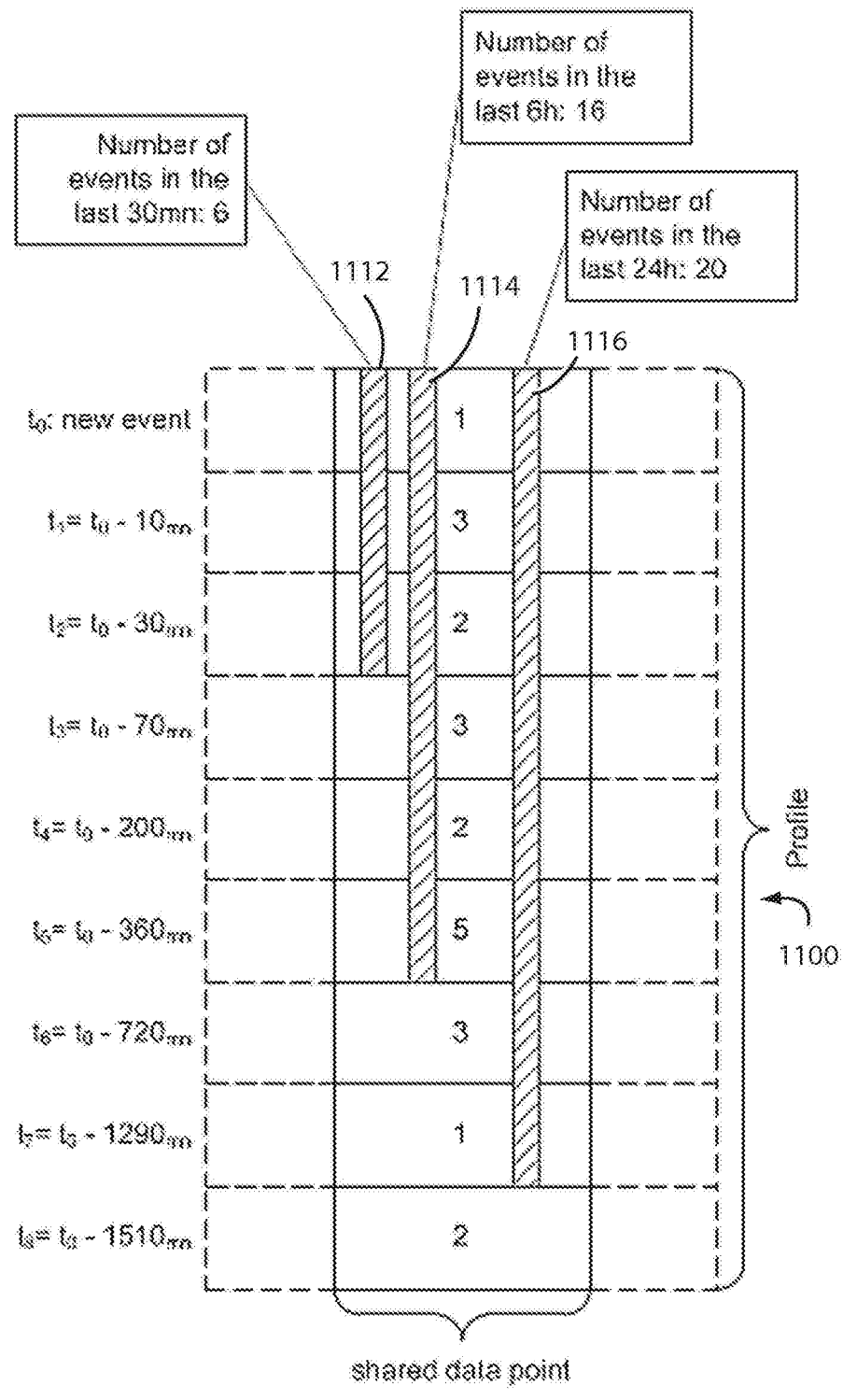
FIG. 11 is a diagram of a small part of an exemplary smart agent profile that spans several time intervals.

FIG. 11 illustrates an example of a profile 1100 that spans a number of time intervals $t_0$ to $t_8$. Transactions, and therefore profiles normally have dozens of datapoints that either come directly from each transaction or that are computed from transactions for a single entity over a series of time intervals. A typical datapoint 1110 velocity counts the number of events that have occurred in the last thirty minutes (count 1112), the last six hours (count 1114), and the last twenty-four hours (count 1116). In this example, to had one event, $t_1$ had 3 events, $t_2$ had 2 events, $t_3$ had 3 events, $t_4$ had 2 events, $t_5$ had events, $t_6$ had 3 events, $t_7$ had one event, and is had 2 events; therefore, $t_2$ count 1112=6, $t_5$ count 1114=16, and $t_7$ count 1116=20. These three counts, 1112-1116 provide their velocity count computations in a simple and quick-to-fetch summation.

Figure 12:
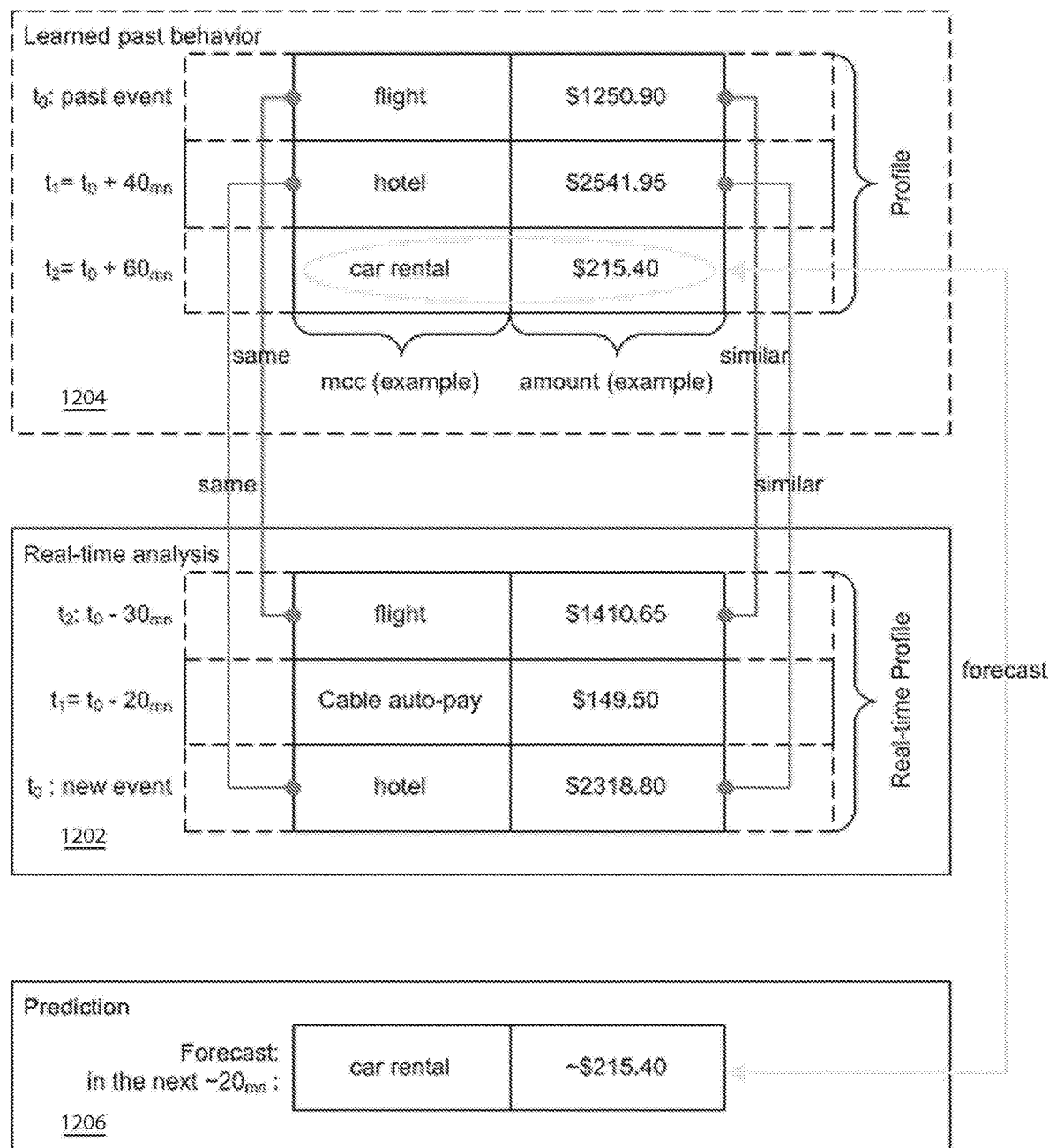
FIG. 12 is a diagram of a behavioral forecasting aspect of the present invention.

FIG. 12 illustrates a behavioral forecasting aspect of the present invention. A forecast model 1200 engages in a real-time analysis 1202, consults a learned past behavior 1204, and then makes a behavioral prediction 1206. For example, the real-time analysis 1202 includes a flight purchase for $1410.65, an auto pay for cable for $149.50, and a hotel for $2318.80 in a most recent event. It makes sense that the booking and payment for a flight would be concomitant with a hotel expense, both represent travel. Consulting the learned past behavior 1204 reveals that transactions for flights and hotels has also been accompanied by a car rental. So an easy forecast for a car rental in the near future is and easy and reasonable assumption to make in behavioral prediction 1206.

Normally, an out-of-character expense for a car rental would carry a certain base level of risk. But if it can be forecast one is coming, and it arrives, then the risk can reduced since it has been forecast and is expected. Embodiments of the present invention therefore temporarily reduce risk assessments in the future transactions whenever particular classes and categories of expenses can be predicted or forecast.

In another example, a transaction to pay tuition at a local college could be expected to result in related expenses. So forecasts for bookstore purchases and ATM cash withdrawals at the college are reasonable. The bottom-line is fewer false positives will result.

FIG. 13 illustrates a forecasting example 1300. A smart agent profile 1302 has several datapoint fields, field$_1$ through field$_n$. Here we assume the first three datapoint fields are for the MCC, zipcode, and amount reported in a new transaction. Several transaction time intervals spanning the calendar year include the months of January . . . December, and the Thanksgiving and Christmas seasons. In forecasting example 1300 the occurrence of certain zip codes is nine for 94104, seven for 94105, and three for 94110. Transaction amounts range $5.80 to $274.50 with an average of $84.67 and a running total of $684.86.

A first transaction risk example 1304 is timestamped Dec. 5, 2013 and was for an unknown grocery store in a known zipcode and for the average amount. The risk score is thus plus, minus, minus for an overall low-risk.

A second transaction risk example 1306 is also timestamped Dec. 5, 2013 and was for a known grocery store in an unknown zipcode and for about the average amount. The risk score is thus minus, plus, minus for an overall low-risk.

A third transaction risk example 1308 is timestamped Dec. 5, 2013, and was for an airline flight in an unknown, far away zipcode and for almost three times the previous maximum amount. The risk score is thus triple plus for an overall high-risk. But before the transaction is flagged as suspicious or fraudulent, other datapoints can be scrutinized.

Each datapoint field can be given a different weight in the computation in an overall risk score.

In a forecasting embodiment of the present invention, each datapoint field can be loaded during an earlier time interval with a positive or negative bias to either sensitize or desensitize the category to transactions affecting particular datapoint fields in later time intervals. The bias can be permanent, temporary, or decaying to none.

For example, if a customer calls in and gives a heads up they are going to be traveling next month in France, then location datapoint fields that detect locations in France in next month's time intervals can be desensitized so that alone does not trigger a higher risk score. (And maybe a "declined" response.)

Some transactions alone herald other similar or related ones will follow in a time cluster, location cluster, and/or in an MCC category like travel, do-it-yourself, moving, and even maternity. Still other transactions that time cluster, location cluster, and/or share a category are likely to reoccur in the future. So a historical record can provide insights and comfort.

Figure 14:
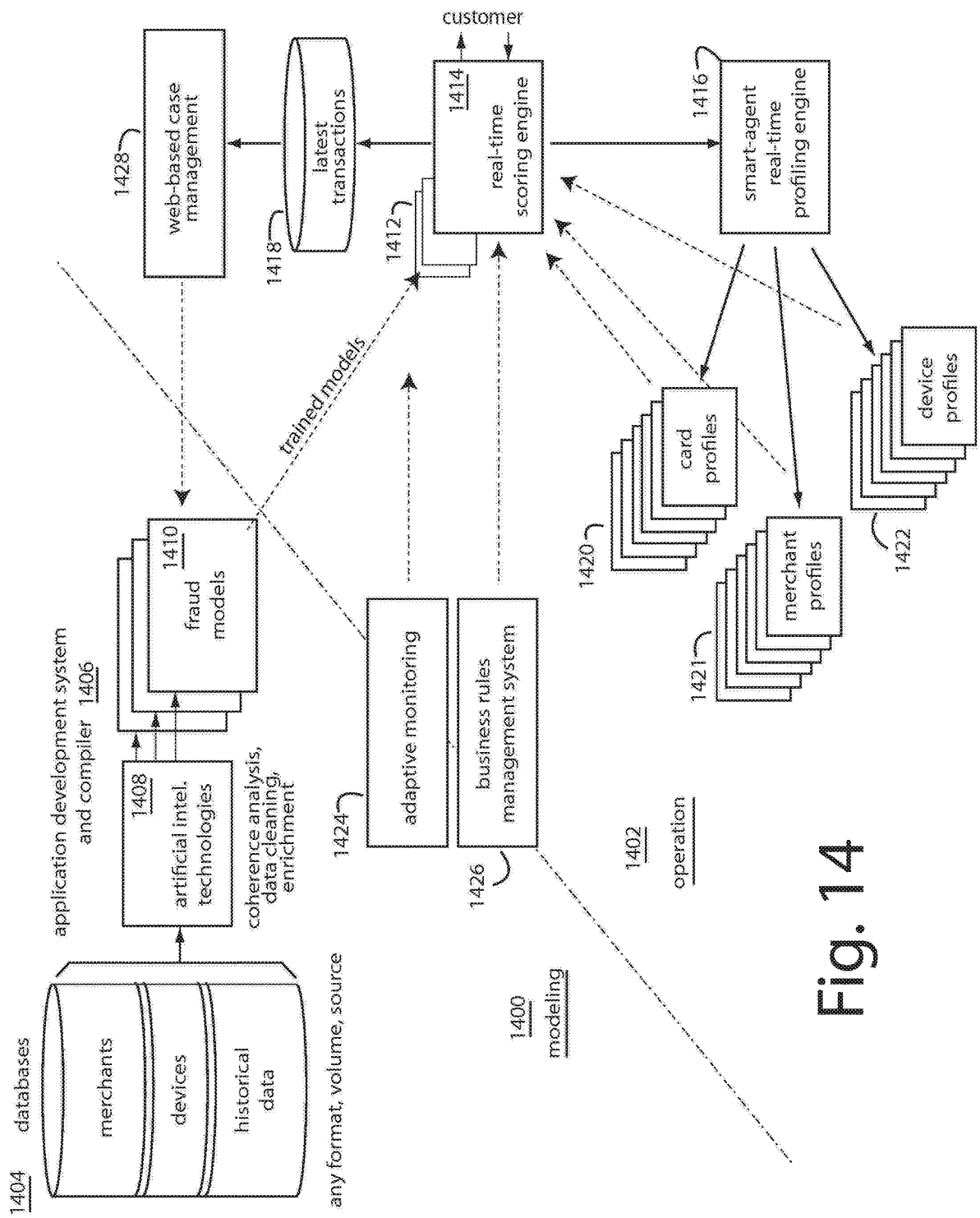
FIG. 14 is a functional block diagram of a modeling and operational environment in which an application development system is used initially to generate, launch, and run millions of smart agents and their profiles.

FIG. 14 represents the development, modeling, and operational aspects of a single-platform risk and compliance embodiment of the present invention that depends on millions of smart agents and their corresponding behavioral profiles. It represents an example of how user device identification (Device ID) and profiling is allied with accountholder profiling and merchant profiling to provide a three-dimensional examination of the behaviors in the penumbra of every transaction and authorization request. The development and modeling aspects are referred to herein by the general reference numeral 1400. The operational aspects are referred to herein by the general reference numeral 1402. In other words, compile-time and run-time.

The intended customers of embodiments of the present invention are financial institutions who suffer attempts by fraudsters at payment transaction fraud and need fully automated real-time protection. Such customers provide the full database dossiers 1404 that they keep on their authorized merchants, the user devices employed by their accountholders, and historical transaction data. Such data is required to be accommodated in any format, volume, or source by an application development system and compiler (ADSC) 1406. ADSC 1406 assists expert programmers to use a dozen artificial intelligence and classification technologies 1408 they incorporate into a variety of fraud models 1410. This process is more fully described in U.S. patent application Ser. No. 14/514,381, filed Oct. 15, 2014 and titled, ARTIFICIAL INTELLIGENCE FRAUD MANAGEMENT SOLUTION. Such is fully incorporated herein by reference.

One or more trained fraud models 1412 are delivered as a commercial product or service to a single platform risk and compliance server with a real-time scoring engine 1414 for real-time multi-layered risk management. In one perspective, trained models 1412 can be viewed as efficient and compact distillations of databases 1404, e.g., a 100:1 reduction. These distillations are easier to store, deploy, and afford.

During operation, real-time scoring engine 1414 provides device ID and clickstream analytics, real-time smart agent profiling, link analysis and peer comparison for merchant/internal fraud detection, real-time cross-channel fraud prevention, real-time data breach detection and identification device ID and clickstream profiling for network/device protection.

A real-time smart agent profiling engine 1416 receives behavioral digests of the latest transactions 1418 and uses them to update three populations of profiles 1420-1422. Specifically, a population of card profiles 1420, a population of merchant profiles 1421, and a population of device profiles 1422 all originally generated by ADSC 1406 and included in the trained models 1412'. These are all randomly and individually consulted in real-time by smart agent profiling engine 1416 to understand what is "normal" for a particular card, merchant, and user device.

Real-time smart agent profiling engine 1416 accepts customer transaction data and scores each line. Such scores are in accordance with business rules provided by a business rules management system (BRMS) 1424 and any adaptive updates 1426 needed to the original set of models 1410 produced by artificial intelligence technologies and classifiers 1408. A web-based case management system 1428 uses false positives and false negatives to tighten up models 1410. These are periodically used to remotely update models 1412.

In general smart agent process embodiments of the present invention generate a population of smart agent profiles by data mining of historical transaction data. A corresponding number of entities responsible for each transaction are sorted and each are paired with a newly minted smart agent profile. Each smart agent profile so generated is modelled to collect and list individual and expanded attributes of said transactions in one column dimension and by time interval series in another row dimension. Each smart agent profile is stored in a file access system of a network server platform.

Each newly arriving transaction record is compared and contrasted attribute-by-attribute with the time interval series of attributes archived in its paired smart agent profile, and each such comparison and contrast incrementally increases or decreases a computed fraud risk score. The computed fraud risk score is thereafter output as a determination of whether the newly arriving transaction record represents a genuine transaction, a suspicious transaction, or a fraudulent transaction. Or maybe just OK-bad, or a fuzzy score between 0 . . . 1.

Each time interval series can be partitioned or divided in its row dimension into a real-time part and a long-term part to separately pre-compute from the real-time part and the long-term part a velocity count and statistics of said individual and expanded attributes. The newly arriving transaction record is then compared item-by-item to relevant items in each said real-time part and long-term part, and thereby determines if each item represents known behavior or unknown behavior.

Each newly arriving transaction record is inspected to see if the entity it represents has not yet been paired to a smart agent profile, and if not then generating and pairing a newly minted smart agent profile for it.

In another embodiment, three populations of smart agent profiles are generated by learning from the historical transaction data. A corresponding number of cardholder, merchant, and identified device entities involved in each transaction are sorted and each are paired with a newly minted smart agent profile. Then, each newly arriving transaction record is compared and contrasted attribute-by-attribute with the time interval series of attributes archived in the smart agent profiles paired with the particular cardholder, and with the particular merchant, and with the particular identified device (Device ID), and each such comparison and contrast incrementally increases or decreases a computed overall fraud risk score. See our U.S. patent application Ser. No. 14/517,863, filed 19-OCT-2014, and titled User Device Profiling In Transaction Authentications, for details on the Device ID technology we have in mind here.

DATA BREACH DETECTION: The artificial intelligence and machine learning techniques described above can be applied a unique combination to build effective data breach detection systems. A broad set of data was tested that included daily merchant card transactions from Nov. 1, 2013 to Dec. 31, 2013. Our analytics were applied to this dataset, and resulted in a greatly accelerated detection that a breach had occurred with Target.

Conventional methods are very slow because the rely on warehouses of already confirmed fraud.

Figure 15B:
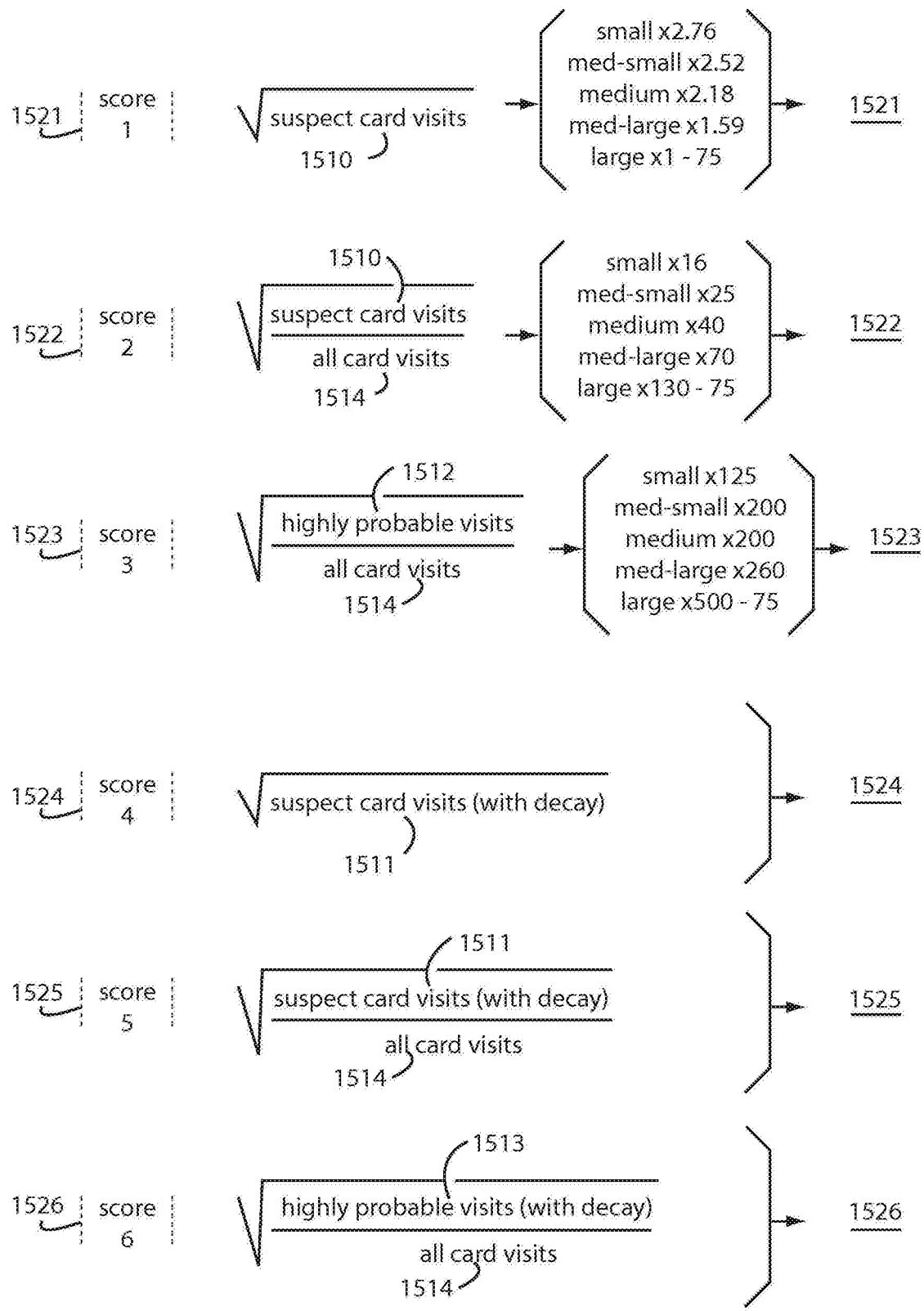
Figure 15C:
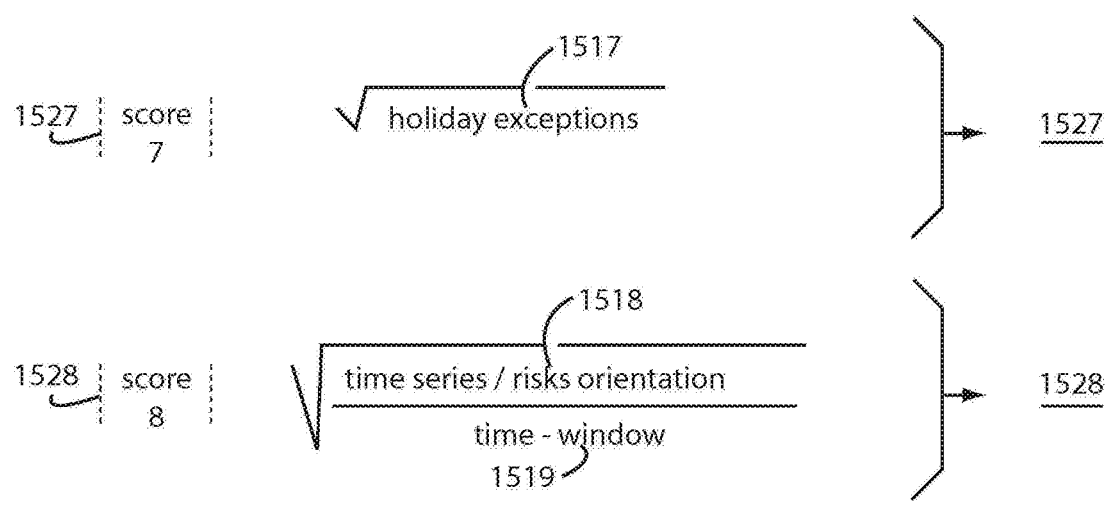

FIGS. 15A, 15B, and 15C represent a data breach detection system embodiment of the present invention, and is referred to herein by the general reference numeral 1500. The object is to develop an early warning that a merchant has suffered a data breach of sensitive cardholder and payment information. Data breach detection system 1500 focuses on the correlations between cardholders, merchants, and transaction dates in transactions receiving high risk fraud scores, e.g., 118 (FIG. 1), 428 (FIG. 4), 552 (FIG. 5), 728 (FIG. 7), and 1414 (FIG. 14).

In tests with historical transaction data involving Target Corporation Stores, fraud scores such as these rose sharply at the same time the criminals begin their "test and try" activity. E.g., the first week of December. The following Table is of selected key variables that were used to drive the analytics. Moderate increases in fraud are customary and expected during the days following Thanksgiving (Black Friday weekend). But Target Corporation saw a steady increase in suspicious card use. They also saw cards with confirmed fraud which had only been used at Target during the period in question.

TABLE

Selected Key Variables

| Transaction Date | Suspicious card use over the monitoring period | Cards with high fraud scores, only used at Target, over the monitoring period |
| --- | --- | --- |
| Nov. 27, 2013 | 0.214% | 0.002% |
| Nov. 28, 2013 | 0.216% | 0.002% |
| Nov. 29, 2013 | 0.218% | 0.002% |
| Nov. 30, 2013 | 0.231% | 0.002% |
| Dec. 1, 2013 | 0.254% | 0.003% |
| Dec. 2, 2013 | 0.267% | 0.003% |
| Dec. 3, 2013 | 0.276% | 0.003% |
| Dec. 4, 2013 | 0.302% | 0.003% |
| Dec. 5, 2013 | 0.306% | 0.003% |

TABLE-continued

Selected Key Variables

| Transaction Date | Suspicious card use over the monitoring period | Cards with high fraud scores, only used at Target, over the monitoring period |
|---|---|---|
| Dec. 6, 2013 | 0.307% | 0.003% |
| Dec. 7, 2013 | 0.309% | 0.003% |
| Dec. 8, 2013 | 0.310% | 0.003% |
| Dec. 9, 2013 | 0.304% | 0.003% |
| Dec. 10, 2013 | 0.300% | 0.003% |
| Dec. 11, 2013 | 0.298% | 0.003% |
| Dec. 12, 2013 | 0.299% | 0.003% |
| Dec. 13, 2013 | 0.301% | 0.003% |
| Dec. 14, 2013 | 0.304% | 0.003% |
| Dec. 15, 2013 | 0.304% | 0.003% |
| Dec. 16, 2013 | 0.302% | 0.003% |
| Dec. 17, 2013 | 0.299% | 0.004% |

A comparison was made of the data breach detection system scores between Target and other merchants that cater to a similar demographic and during the same time period. The scores showed that cards used at Target displayed behaviors that were clearly irregular, and evidence of abnormal behavior became clear as early as the first week of December.

The data breach detection system scores for Target were contrasted with an online gaming merchant's scores. The online gaming merchant had a higher baseline of fraud, but their scores held steady during the timeframe of Target's breach.

The data breach detection system tests examined network level data, but would also be effective when applied to a large issuer or processor's dataset. Data breach detection system embodiments of the present invention snaps quicker to anomalous behaviors that are suggestive of a breach. As such, their use can minimize looming negative impacts.

Data breach detection system embodiments of the present invention analyze fraudulent card activities and evaluate real-time transactions to determine if any come from a compromised merchant, before waiting for transactions to be reported as fraudulent by the cardholder. These data breach detection systems use the daily transactions to collect all cards with a large fraud score (very high risk). A lowered score threshold allows a larger more sensitive detection rate of all frauds, while a higher setting will reduce false positives.

In tests, some transactions that were considered to be fraudulent were often the fallout from aggressive merchants. Such merchants force subscriptions and reoccurring payments that are difficult to cancel and often misunderstood by customers. So since these are not the result of a data breach, a filter was placed on the initial fraud card collection to exclude reoccurring transactions.

Newly acquired fraudulent cards are often tested by criminals to see if the cards will still work, before stepping up to more serious levels of fraud. These test transactions are always for small amounts, and will not be detected and reported as fraud, even though they are. So in the tests, a filter was placed on seemingly genuine transactions to exclude transactions of $2.00 or less. It is anticipated that including only transactions of $2.00 or less could lead to detecting test merchants, as opposed to a data breach.

A table is assembled for each merchant in the reported high risk transaction data. A temporary key is used in place of the original merchant identifier to make for a more uniform data type. Transactions for peak season dates, such Black Friday to Cyber Monday, were dropped. The card information, merchant information, and how the combinations of card/merchants interact and the last time each card visits a particular merchant were grouped together. The merchants each cardholder visited were ranked "1" (first), to the last, but no higher than "100".

A larger information matrix organizing the merchant and card information was created after cleaning up the data. Each row represented a different card, and a list of the past one hundred merchants they visited, which allowed a quick broad view of events.

In a next step, the card and merchant matrix is evaluated, by summing over rows and then the columns to create scoring criteria that spans more than one statistic at a time. These scores are balanced, adjusted, and combined into a singular final score. A summary table for each outlet, and initial scoring criteria is created. The summary table included the number of suspect cards that visited, the sum of the percentages of those cards visits, and more advanced strategies still being testing.

Each outlet has linear combinations of the summary statistics and initial scoring criteria placed together to come up with a final score. Different strategies are being used, and filters are edited to help evaluate, understand, and update the scores.

FIG. 15A shows how the daily inflow of transactions 1502 is fed to a smart agent artificial intelligence fraud scoring platform 1504 to obtain a daily set 1506 of transactions with high fraud scores.

A number of different statistics are used in the scoring mechanisms. These fields are highly relevant to data breaches and helpful for judging the predictions of the final scores later. For example in FIG. 15A these are listed as suspect-card-visits 1510, suspect-card-visits-with decay 1511, highly-probable-visits 1512, highly-probable-visits-with decay 1513, and all-card-visits 1514. Defined another way:

1. NUMBER_OF_CARDS
   a. This is the total number of different cards (Genuine and Suspect) seen by a merchant in the past, e.g., 30 days.
   b. Used to differentiate merchant size
   c. Inversely proportionate to the risk of data breach.
2. SUSPECT_CARD_VISITS
   a. This is the total number of different suspect cards seen by a merchant in the past, e.g., 30 days.
   b. Major part of scoring for data breach
3. SUM_PROB_VISITS
   a. This is the total number of suspect cards, which were highly probable to have been breached at that merchant, seen by a merchant in the past, e.g., 30 days.
   b. These combinations are considered more high risk because the card has only visited that merchant in this time period.
4. SUSPECT_CARD_VISITS_DCY
   a. Similar to SUSPECT_CARD_VISITS, but includes a decaying function based on how many merchants were visited between the current merchant and the suspected fraud.
   b. Not currently used, but available for continued future analysis.
5. SUM_PROB_VISITS_DCY
   a. Similar to SUM_PROB_VISITS, but cards which have visited more than one merchant also add to the score proportional to the number of other merchants they have visited.

b. This version also includes decay similar to SUSPECT_CARD_VISITS_DCY which is included with the proportional value change. (This extra decay can be removed).
c. Not currently used, but available for continued future analysis.
6. PCT_OFSCARDS_STOLEN_LATER
    a. This is SUSPECT_CARD_VISITS/NUMBER_OF_CARDS=the percentage of suspect cards out of all cards seen by that merchant.
7. SUM_PROB_DIV_NUM_CRD
    a. This is SUM_PROB_VISITS/NUMBER_OF_CARDS=the percentage of suspect cards that visited only that merchant out of all cards seen by that merchant.
8. Run_Date
    a. The day that the Data breach detection system was run on, expected to equal today's date, but can be different when run over past data for historical observations and testing.

Score balancing is needed to level the playing field, the scores and other information are collected and used to compare merchants and determine the optimal strategy for merchant and data breach risk. Because of the large differences between merchant sizes, the collected scores were weighted in merchant categorization process 1508 based on how many cards, genuine and suspect, a merchant has seen within the past thirty days. There are five main groups 1515, medium-small, medium, and medium-large, and large. Most merchants scored belonged in the middle three groups: medium-small, medium, and medium-large.

Group Sizes 1515
1. Small: 0 to 1000 cards seen
2. Medium-Small: 1000 to 2,000 cards seen
3. Medium: 2,000 to 5,000 cards seen
4. Medium-Large: 5,000 to 10,000 cards seen
5. Large: 10,000 or more cards seen Score transformations are based on the distributions and values of the main scoring statistics seen, new derived values are created. Because many of these scores had large disproportionate distributions, the square root function was used to normalize significant values and lower outlier values while preserving score rankings.

| SCORE_1 | $\sqrt{\text{SuspectCardVisits}}$ |
|---|---|
| SCORE_2 | $\sqrt{\dfrac{\text{Suspect Card Visits}}{\text{All Card Visits}}}$ |
| SCORE_3 | $\sqrt{\dfrac{\text{Highly Probable Visits}}{\text{All Card Visits}}}$ |
| SCORE_4 1524 | $\sqrt{\text{SuspectCardVisits(WithDecay)}}$ |
| SCORE_5 1525 | $\sqrt{\dfrac{\text{Suspect Card Visits (With Decay)}}{\text{All Card Visits}}}$ |
| SCORE_6 1526 | $\sqrt{\dfrac{\text{Highly Probable Visits (With Decay)}}{\text{All Card Visits}}}$ |
| SCORE_7 1527 | $\sqrt{\text{HolidaysExceptions (1517)}}$ |
| SCORE_8 1528 | $\sqrt{\dfrac{\text{Time series/risk orientation (1518)}}{\text{Time} - \text{Window (1519)}}}$ |

A handful of merchants at the top list were verified in testing by searching through news reports, articles, and other media sources available. In FIG. 15B, a score-1 1521, a score-2 1522, and a score-3 1523 were chosen based on their comparative values for a few known data breaches. These scores for known data breaches were compared to the general population of all scores seen in the set being tested.

Scores 1521-1523 were balanced with others all within each merchant size group 1515. The center values (median/average) of Score-1 1521 were compared to the center values of Score-2 1522 and score-3 1523. As seen in FIG. 15B, multipliers for Score-2 and Score-3 were created based on these numbers. So any merchant showing a large value, when compared to other merchants in their group, in one or multiple parts of these scores could spring an alert.

| SIZE ADJUSTMENTS | | | | |
|---|---|---|---|---|
| Merchant Size | Score-1 Multiplier | Score-2 Multiplier | Score-3 Multiplier | Flat Adjustment |
| Small | 2.76 | 16 | 125 | 0 |
| Medium-Small | 2.52 | 25 | 200 | 0 |
| Medium | 2.18 | 40 | 200 | 0 |
| Medium-Large | 1.59 | 70 | 260 | 0 |
| Large | 1 | 130 | 500 | −75 |

A similar multiplier was created for Score-1, comparing the ratio of large Score-1 to the other merchant sizes' Score-1. This multiplier adjusts all five groups final scores for the same scale. This allows all merchants, regardless of size, to be considered for a data breach. This was not done on Score-2 and Score-3 because they already included the total cards seen within their calculations.

Merchants within the Large group have an almost guaranteed number of suspect transactions due to size alone, Score-1 was seen to have larger minimum and maximums for this group. A flat value of 75 is deducted from the Large merchant scores, these are determined by where the difference in distributions of initial combination scores for the Large group versus all other groups.

Figure 15D:
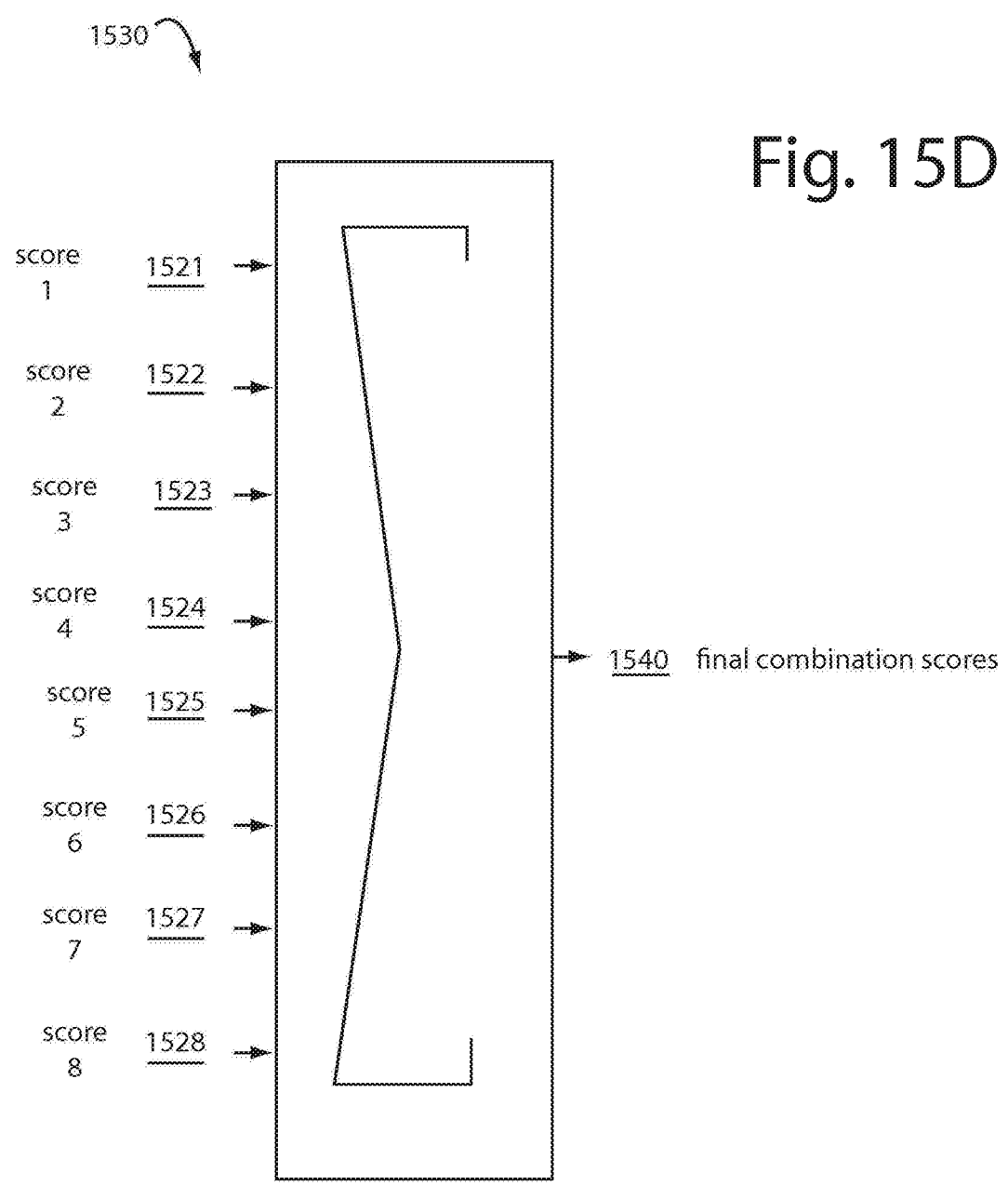

In FIG. 15D, after adjustments are made, all scores 1521-1528 (FIGS. 15B and 15C) are added together in a summation process 1530 for each merchant, and final combination scores 1540 are created. These scores reflect the estimated risks that any particular merchant suffered a data breach.

The prototype data breach detection system was rerun using historical data for each day between Nov. 1, 2013 to Jan. 31, 2014. The following table includes the top highest scoring merchants within each merchant group size they belonged to, with the first date they broke the threshold of 50.0, and with the highest score they ultimately received in the time line.

| OUTLET_ID | MERCHANT GROUPING | FIRST ALERT DATE | TOP SCORE |
|---|---|---|---|
| 003286 I | large | 1 Nov. yr | 215.019167 |
| 0032862 | large | 1 Nov. yr | 158.807118 |
| 0032863 | large | 1 Nov. yr | 145.472479 |

-continued

| OUTLET_ID | MERCHANT GROUPING | FIRST ALERT DATE | TOP SCORE |
|---|---|---|---|
| 005541 I | medium | 2 Nov. yr | 143.720407 |
| 004798 I | large | 1 Nov. yr | 125.645545 |
| 0032864 | large | 1 Nov. yr | 122.459354 |
| 0082732 | large | 1 Nov. yr | 108.013765 |
| 007260I | medium-large | 1 Nov. yr | 107.884795 |
| 0032866 | large | 1 Nov. yr | 105.166112 |
| 0039622 | medium | 1 Nov. yr | 104.738724 |
| 0082734 | medium | 1 Nov. yr | 103.088835 |
| 0029508 | small | 24 Jan. next year | 97.705843 |
| 0074780 | medium | 26 Dec. yr | 93.0173564 |
| 0067200 | medium | 29 Dec. yr | 90.6907448 |
| 0029500 | medium | 1 Nov. yr | 89.9405071 |

False positives were still seen as possible, even though steps were taken to remove aggressive merchants and small-amount tested merchants from the data. There were some residual effects of these merchants in the final outcomes. Their effects are considered to be minimal, and over time any reoccurring alerts on these merchants would become more evident.

| Run Date | NUMBER_OF_CARDS | SUSPECT_CARD_VISITS | SUM_PROB_VISITS |
|---|---|---|---|
| 18, Nov. yr | 5,256,362 | 11,102 | 137 |
| 19, Nov. yr | 5,237,723 | 10,983 | 136 |
| 20, Nov. yr | 5,213,239 | 10,953 | 137 |
| 21, Nov. yr | 5,224,253 | 11,065 | 130 |
| 22, Nov. yr | 5,232,915 | 11,165 | 125 |
| 23, Nov. yr | 5,237,325 | 11,284 | 131 |
| 24, Nov. yr | 5,257,310 | 11,440 | 139 |
| 25, Nov. yr | 5,317,823 | 11,531 | 155 |
| 26, Nov. yr | 5,309,759 | 11,386 | 144 |
| 27, Nov. yr | 5,309,074 | 11,356 | 121 |
| 28, Nov. yr | 5,340,793 | 11,532 | 130 |
| 29, Nov. yr | 5,389,232 | 11,726 | 129 |
| 30, Nov. yr | 5,248,363 | 12,127 | 120 |
| 1, Dec. yr | 5,133,081 | 13,039 | 130 |
| 2, Dec. yr | 5,002,787 | 13,355 | 131 |
| 3, Dec. yr | 4,827,851 | 13,332 | 134 |
| 4, Dec. yr | 4,668,190 | 14,101 | 125 |
| 5, Dec. yr | 4,713,529 | 14,432 | 130 |
| 6, Dec. yr | 4,750,209 | 14,571 | 144 |
| 7, Dec. yr | 4,789,920 | 14,797 | 156 |

FIG. 15E represents four time series of payment card transactions 1550 belonging to seemingly unrelated Cardholder-A 1551, Cardholder-B 1552, Cardholder-C 1553, and Cardholder-D 1554. Cardholder-A and the others all came to the attention of Data Breach Detection system 1500 by virtue of having had been associated with a transaction scored as high risk by artificial intelligence fraud scoring platform 1504. That further instituted a fetch of all the recent transactions the Cardholder was involved in with an eye to the merchants or other points-of-compromise (POC) they visited. Once all the possibly compromised Cardholders have thus been brought forward, summation process 1530 searches for a POC intersection 1560. The common intersections are inspected for even earlier contacts with the POC's. Here, in this example, merchant-R appears to be a likely point-of-compromise.

Once a point-of-compromise is in the view-sights of Data Breach Detection system 1500, all the cardholders and transactions they handled during a critical time frame can be investigated to develop a further focus and confirmation. Investigators can thereby "zoom in" and search for the telltale signs of a data breach.

Figure 16:
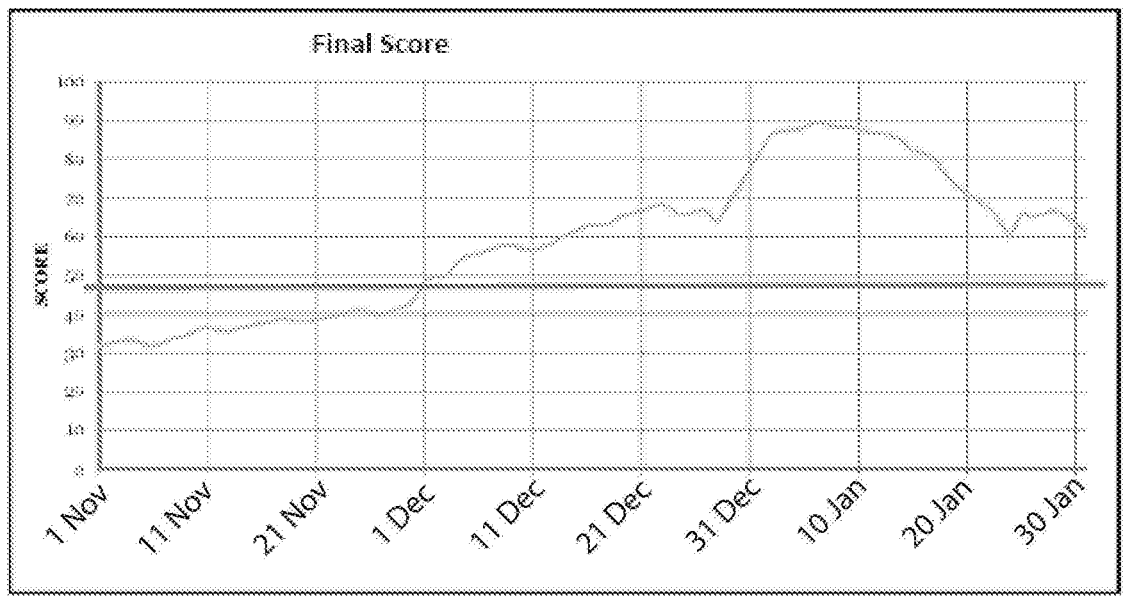
FIG. 16 is a graph of the scores computed from historical data for Target from November 2013 to January 2014.

FIG. 16 graphs the scores computed for a Retailer from the historical data between November to the next January. About the same time period, when the fraud score for the Retailer broke a threshold of 50.0, an investigation was made to see what other merchants also broke the same threshold. Those that did are listed below, except for merchants which had a score of 50.0 or greater in the previous week. They were excluded.

Although particular embodiments of the present invention have been described and illustrated, such is not intended to limit the invention. Modifications and changes will no doubt become apparent to those skilled in the art, and it is intended that the invention only be limited by the scope of the appended claims.

What is claimed is:

1. At least one computer network server for detection of merchant data breaches, the at least one server comprising:
   one or more processors;
   non-transitory computer-readable storage media having computer-executable instructions stored thereon, wherein when executed by the one or more processors the computer-readable instructions cause the one or more processors to—
   automatically receive transaction data corresponding to a plurality of transactions, the transaction data including a merchant identifier and a payment card identifier for each of the plurality of transactions;
   automatically compute a fraud score for each of the plurality of transactions;
   automatically identify a subset of the fraud scores, each of the fraud scores of the subset exceeding a first threshold;
   automatically count members of the subset corresponding to each of the merchant identifiers;
   automatically count the number of the plurality of transactions corresponding to each of the merchant identifiers;
   automatically compute and normalize a plurality of merchant fraud scores for each of the merchant identifiers based at least in part on the counted members and the number of the plurality of transactions corresponding to each merchant identifier;
   automatically balance each of the plurality of merchant fraud scores corresponding to each of the merchant identifiers based at least in part on center values for merchant identifier groups;

automatically sum the plurality of merchant fraud scores corresponding to each of the merchant identifiers to generate a final merchant fraud score for each of the merchant identifiers;

automatically compare the final merchant fraud against a second threshold to identify a possible breach;

automatically issue a warning based on the identified possible breach.

2. The at least one computer network server of claim 1, wherein the normalization and balancing of a merchant fraud score of the plurality of merchant fraud scores corresponding to each of the merchant identifiers includes— computing the square root of the number of counted members of the subset corresponding to the merchant identifier;

multiplying the square root by a score-balancing multiplication factor corresponding to one of the merchant identifier groups.

3. The at least one computer network server of claim 1, wherein the normalization and balancing of a merchant fraud score of the plurality of merchant fraud scores corresponding to each of the merchant identifiers includes— computing the square root of the number of counted members of the subset corresponding to the merchant identifier divided by the number of the plurality of transactions corresponding to the merchant identifier;

multiplying the square root by a score-balancing multiplication factor corresponding to one of the merchant identifier groups.

4. The at least one computer network server of claim 1, wherein the computer-readable instructions further instruct the one or more processors to automatically delineate the merchant identifier groups based at least in part on the numbers of the plurality of transactions corresponding to the merchant identifiers.

5. The at least one computer network server of claim 1, wherein automatically computing the fraud score for each of the plurality of transactions includes— automatically matching the transaction to a profile comprising a time interval series of attributes mined from historical transaction data;

automatically incrementally changing a fraud risk based on attribute-by-attribute comparison of the transaction data corresponding to the transaction against the profile;

automatically outputting the fraud score for the transaction based at least in part on the comparison against the profile.

6. The at least one computer network server of claim 1, wherein the computer-readable instructions further instruct the one or more processors to— automatically inspect each of the plurality of transactions for an initial match among a plurality of profiles;

automatically generate a new profile for each of the plurality of transactions lacking an initial match among the plurality of profiles.

7. The at least one computer network server of claim 1, wherein automatically computing the fraud score for each of the plurality of transactions includes—automatically matching the transaction to three profiles, each of the three profiles comprising a time interval series of attributes mined from historical transaction data, the three profiles being respectively matched based on the payment card identifier, the merchant identifier and an identified device corresponding to the transaction;

automatically incrementally changing a fraud risk based on attribute-by-attribute comparison of the transaction data corresponding to the transaction against the profiles;

automatically outputting the fraud score for the transaction based at least in part on the comparison against the profiles.

8. Non-transitory computer-readable storage media having computer-executable instructions for detection of merchant data breaches, wherein when executed by at least one processor the computer-readable instructions cause the at least one processor to:

automatically receive transaction data corresponding to a plurality of transactions, the transaction data including a merchant identifier and a payment card identifier for each of the plurality of transactions;

automatically compute a fraud score for each of the plurality of transactions;

automatically identify a subset of the fraud scores, each of the fraud scores of the subset exceeding a first threshold;

automatically count members of the subset corresponding to each of the merchant identifiers;

automatically count the number of the plurality of transactions corresponding to each of the merchant identifiers;

automatically compute and normalize a plurality of merchant fraud scores for each of the merchant identifiers based at least in part on the counted members and the number of the plurality of transactions corresponding to each merchant identifier;

automatically balance each of the plurality of merchant fraud scores corresponding to each of the merchant identifiers based at least in part on center values for merchant identifier groups;

automatically sum the plurality of merchant fraud scores corresponding to each of the merchant identifiers to generate a final merchant fraud score for each of the merchant identifiers;

automatically compare the final merchant fraud against a second threshold to identify a possible breach;

automatically issue a warning based on the identified possible breach.

9. The non-transitory computer-readable storage media of claim 8, wherein the normalization and balancing of a merchant fraud score of the plurality of merchant fraud scores corresponding to each of the merchant identifiers includes— computing the square root of the number of counted members of the subset corresponding to the merchant identifier;

multiplying the square root by a score-balancing multiplication factor corresponding to one of the merchant identifier groups.

10. The non-transitory computer-readable storage media of claim 8, wherein the normalization and balancing of a merchant fraud score of the plurality of merchant fraud scores corresponding to each of the merchant identifiers includes— computing the square root of the number of counted members of the subset corresponding to the merchant identifier divided by the number of the plurality of transactions corresponding to the merchant identifier;

multiplying the square root by a score-balancing multiplication factor corresponding to one of the merchant identifier groups.

11. The non-transitory computer-readable storage media of claim 8, wherein the computer-readable instructions further instruct the at least one processor to automatically delineate the merchant identifier groups based at least in part on the numbers of the plurality of transactions corresponding to the merchant identifiers.

12. The non-transitory computer-readable storage media of claim 8, wherein automatically computing the fraud score for each of the plurality of transactions includes—
    automatically matching the transaction to a profile comprising a time interval series of attributes mined from historical transaction data;
    automatically incrementally changing a fraud risk based on attribute-by-attribute comparison of the transaction data corresponding to the transaction against the profile;
    automatically outputting the fraud score for the transaction based at least in part on the comparison against the profile.

13. The non-transitory computer-readable storage media of claim 8,
    wherein the computer-readable instructions further instruct the at least one processor to—automatically inspect each of the plurality of transactions for an initial match among a plurality of profiles;
    automatically generate a new profile for each of the plurality of transactions lacking an initial match among the plurality of profiles.

14. The non-transitory computer-readable storage media of claim 8, wherein automatically computing the fraud score for each of the plurality of transactions includes—
    automatically matching the transaction to three profiles, each of the three profiles comprising a time interval series of attributes mined from historical transaction data, the three profiles being respectively matched based on the payment card identifier, the merchant identifier and an identified device corresponding to the transaction;
    automatically incrementally changing a fraud risk based on attribute-by-attribute comparison of the transaction data corresponding to the transaction against the profiles;
    automatically outputting the fraud score for the transaction based at least in part on the comparison against the profiles.

15. A computer-implemented method for detection of merchant data breaches comprising, via one or more transceivers and/or processors:
    automatically receiving transaction data corresponding to a plurality of transactions, the transaction data including a merchant identifier and a payment card identifier for each of the plurality of transactions;
    automatically computing a fraud score for each of the plurality of transactions;
    automatically identifying a subset of the fraud scores, each of the fraud scores of the subset exceeding a first threshold;
    automatically counting members of the subset corresponding to each of the merchant identifiers;
    automatically counting the number of the plurality of transactions corresponding to each of the merchant identifiers;
    automatically computing and normalizing a plurality of merchant fraud scores for each of the merchant identifiers based at least in part on the counted members and the number of the plurality of transactions corresponding to each merchant identifier;
    automatically balancing each of the plurality of merchant fraud scores corresponding to each of the merchant identifiers based at least in part on center values for merchant identifier groups;
    automatically summing the plurality of merchant fraud scores corresponding to each of the merchant identifiers to generate a final merchant fraud score for each of the merchant identifiers;
    automatically comparing the final merchant fraud against a second threshold to identify a possible breach;
    automatically issuing a warning based on the identified possible breach.

16. The computer-implemented method of claim 15, wherein the normalization and balancing of a merchant fraud score of the plurality of merchant fraud scores corresponding to each of the merchant identifiers includes—
    computing the square root of the number of counted members of the subset corresponding to the merchant identifier;
    multiplying the square root by a score-balancing multiplication factor corresponding to one of the merchant identifier groups.

17. The computer-implemented method of claim 15, wherein the normalization and balancing of a merchant fraud score of the plurality of merchant fraud scores corresponding to each of the merchant identifiers includes—
    computing the square root of the number of counted members of the subset corresponding to the merchant identifier divided by the number of the plurality of transactions corresponding to the merchant identifier;
    multiplying the square root by a score-balancing multiplication factor corresponding to one of the merchant identifier groups.

18. The computer-implemented method of claim 15, further comprising automatically delineating the merchant identifier groups based at least in part on the numbers of the plurality of transactions corresponding to the merchant identifiers.

19. The computer-implemented method of claim 15, wherein automatically computing the fraud score for each of the plurality of transactions includes—
    automatically matching the transaction to a profile comprising a time interval series of attributes mined from historical transaction data;
    automatically incrementally changing a fraud risk based on attribute-by-attribute comparison of the transaction data corresponding to the transaction against the profile;
    automatically outputting the fraud score for the transaction based at least in part on the comparison against the profile.

20. The computer-implemented method of claim 15, wherein automatically computing the fraud score for each of the plurality of transactions includes—
    automatically matching the transaction to three profiles, each of the three profiles comprising a time interval series of attributes mined from historical transaction data, the three profiles being respectively matched based on the payment card identifier, the merchant identifier and an identified device corresponding to the transaction;
    automatically incrementally changing a fraud risk based on attribute-by-attribute comparison of the transaction data corresponding to the transaction against the profiles;

automatically outputting the fraud score for the transaction based at least in part on the comparison against the profiles.

\* \* \* \* \*